US006751335B1

(12) United States Patent
Honsinger

(10) Patent No.: US 6,751,335 B1
(45) Date of Patent: Jun. 15, 2004

(54) METHOD FOR GENERATING A DISPERSED MESSAGE FOR DATA EMBEDDING

(75) Inventor: Chris W. Honsinger, Ontario, NY (US)

(73) Assignee: Eastman Kodak Company, Rochester, NY (US)

( * ) Notice: Subject to any disclaimer, the term of this patent is extended or adjusted under 35 U.S.C. 154(b) by 578 days.

(21) Appl. No.: 09/703,540

(22) Filed: Nov. 1, 2000

(51) Int. Cl.⁷ .................................................. G06K 9/00
(52) U.S. Cl. ...................................... 382/100; 382/279
(58) Field of Search ................................. 382/100, 115, 382/203, 279, 284

(56) References Cited

U.S. PATENT DOCUMENTS

| | | | | |
|---|---|---|---|---|
| 4,392,220 A | * | 7/1983 | Hirosaki et al. | 370/479 |
| 5,850,481 A | * | 12/1998 | Rhoads | 382/232 |
| 5,859,920 A | * | 1/1999 | Daly et al. | 382/115 |
| 5,915,027 A | * | 6/1999 | Cox et al. | 380/54 |
| 5,930,377 A | | 7/1999 | Powell et al. | 382/100 |
| 5,937,000 A | * | 8/1999 | Lee et al. | 375/141 |
| 6,044,156 A | | 3/2000 | Honsinger et al. | 380/54 |
| 6,192,139 B1 | * | 2/2001 | Tao | 382/100 |
| 6,263,086 B1 | | 7/2001 | Wang | 382/100 |
| 6,301,360 B1 | | 10/2001 | Bocionek et al. | 380/28 |
| 6,301,663 B1 | | 10/2001 | Kato et al. | 713/176 |
| 6,415,040 B1 | | 7/2002 | Linnartz et al. | 382/100 |
| 6,425,081 B1 | | 7/2002 | Iwamura | 713/176 |
| 6,456,724 B1 | | 9/2002 | Watanabe | 382/100 |

OTHER PUBLICATIONS van Schyndel et al., "Key Independent Watermark Detection", Proc. IEEE Int. Conf. on Multimedia Computing and Systems, Jun. 7–11, 1999. pp. 580–585.

Honsinger, "Data Embedding Using Phase Dispersion", Eastman Kodak Research Laboratories, Rochester, NY/USA, XP–001164237, pp. 5/1–5/7.

Wiatr et al, Implementation Image Data Convolutions Operations in FPGA Reconfigurable Structures for Real–Time Vision Systems, Institute of Electronics, AGH Technical University of Cracow, Poland, 2000, XP–002253572, 6 pages.

Robshaw, "Stream Ciphers", RSA Laboratories Technical Report TR–701, Version 2.0—Jul. 25, 1995, XP–002253573, 45 pages.

Kaplan, "A Flexible Interleaved Memory Design For Generalized Low Conflict Memory Access", BBN Advanced Computers, Inc., Cambridge, MA, IEEE, 1991, pp. 637–643.

\* cited by examiner

*Primary Examiner*—Leo Boudreau
*Assistant Examiner*—Tom Y. Lu
(74) *Attorney, Agent, or Firm*—Peyton C. Watkins

(57) ABSTRACT

A method of forming a dispersed message for embedding in an image, includes the steps of: providing a random phase carrier; defining a set of ordered bit locations; assigning a polarity to each bit location corresponding to a bit of the message; cyclically shifting the random phase carrier in accordance with each bit location and weighting the cyclically shifted carriers by the polarity of the corresponding bit; and forming a sum of the cyclically shifted weighted carriers to form the dispersed message.

14 Claims, 6 Drawing Sheets

| TABLE FIG. 3A | TABLE FIG. 3B |
|---|---|
| TABLE FIG. 3C | TABLE FIG. 3D |

| 1 | 66 | -7 | 0 | 37 | 23 | -41 | -7 | 23 | 29 | 20 | -29 | 39 | -29 | 19 | -22 | 2 | 6 | -31 | 5 | 39 | -61 | -4 | -52 | 7 | 19 | 23 | -27 | 19 | 9 | -26 7 |
|---|---|---|---|---|---|---|---|---|---|---|---|---|---|---|---|---|---|---|---|---|---|---|---|---|---|---|---|---|---|---|
| -19 | 18 | -33 | 18 | -9 | 31 | 40 | 5 | -14 | -13 | -17 | 12 | 25 | -33 | 9 | -29 | 32 | -37 | 56 | 18 | -6 | 4 | 24 | 9 | -27 | 5 | 9 | -9 | 1 | -4 | 5 0 |
| 2 | 43 | -72 | 4 | -4 | 18 | -53 | 6 | -15 | 19 | -19 | -1 | -3 | -5 | -36 | 15 | -5 | -21 | 15 | -50 | 48 | -3 | -13 | 29 | -25 | -11 | -19 | 44 | -12 | -7 | 15 45 |
| 22 | 18 | 12 | 4 | 2 | 13 | 60 | -5 | -50 | 27 | 44 | 23 | -34 | 0 | 26 | 10 | 12 | 41 | -24 | -8 | 17 | -41 | 11 | -10 | 30 | 37 | 31 | -56 | 52 | -2 | -59 46 |
| 5 | -3 | -62 | 16 | 5 | -10 | 30 | -23 | -22 | 14 | 5 | 0 | 0 | 28 | 21 | 43 | -39 | -36 | 16 | -3 | -11 | 15 | -3 | 22 | -33 | 4 | 15 | -68 | 15 | -7 | 5 -38 |
| -2 | -18 | 21 | 41 | 28 | -74 | -27 | 41 | 41 | -23 | -5 | -7 | -23 | -20 | -27 | -16 | 16 | 9 | 41 | 43 | 2 | 9 | -31 | 28 | 20 | -41 | 40 | -19 | 38 | -2 | 7 35 |
| 53 | 24 | -39 | -7 | -8 | -35 | -6 | 9 | 6 | -12 | 1 | 6 | -43 | 12 | 31 | -36 | 27 | -46 | -14 | -55 | -22 | 5 | -32 | -44 | -47 | 11 | 6 | 64 | -20 | -43 | -3 22 |
| 6 | 15 | -14 | 1 | 4 | 34 | 27 | 26 | -18 | -40 | -8 | 18 | 17 | -8 | 19 | -4 | 3 | -10 | 29 | -74 | 54 | 47 | -5 | 21 | 23 | -29 | 17 | -49 | -45 | 25 | 7 -38 |
| -48 | -23 | 4 | -77 | -9 | -3 | -74 | 6 | -33 | -12 | 31 | 37 | 7 | -17 | -20 | 33 | -47 | -17 | 41 | 16 | -28 | -7 | -10 | 16 | 24 | 26 | -16 | 4 | 42 | 24 | -29 -17 |
| 6 | -4 | 33 | 19 | -15 | 14 | 10 | 36 | 10 | 4 | 18 | 54 | -37 | -50 | 36 | -2 | 24 | 42 | -56 | -20 | -39 | 32 | 28 | -65 | 17 | 1 | -21 | -46 | 1 | 23 | 22 -4 |
| -17 | 17 | -34 | -42 | 5 | 0 | 0 | -2 | 22 | 11 | -42 | -17 | -57 | 16 | 12 | -11 | -6 | 22 | -14 | 1 | -28 | 4 | 16 | 23 | -23 | 40 | -9 | -24 | -24 | -14 | -11 49 |
| 25 | -2 | -11 | 26 | -4 | 41 | -57 | -6 | -12 | 13 | -39 | 39 | 78 | 2 | -67 | 42 | -32 | -5 | 20 | -6 | 11 | 4 | -19 | -3 | -23 | -38 | 16 | 25 | -6 | 12 | -51 -5 |
| 35 | -21 | 58 | 25 | 4 | -7 | 30 | -46 | 0 | 17 | -49 | -8 | 27 | -18 | -1 | 10 | -29 | 37 | 29 | -5 | -31 | 63 | -11 | -15 | 44 | -7 | 26 | 73 | 10 | -5 | -8 32 |
| 9 | -35 | -42 | 14 | -20 | 35 | 21 | -15 | -7 | 36 | -3 | -38 | -36 | 42 | -17 | -8 | -24 | 69 | -44 | 4 | -16 | -3 | -1 | -28 | -16 | 27 | 12 | -4 | -22 | 0 | 6 36 |
| -45 | -6 | 7 | 9 | 4 | -30 | 2 | 12 | -11 | 7 | 26 | 23 | -6 | 5 | -51 | 27 | 25 | 48 | 15 | -1 | 18 | -9 | -7 | 33 | 17 | -23 | -31 | -44 | -7 | -58 | 22 -13 |
| 12 | -16 | 35 | -1 | -3 | -31 | -39 | 24 | 25 | 18 | 27 | -1 | 35 | -14 | -17 | -40 | 4 | -19 | -43 | -64 | 28 | 0 | -13 | 28 | -12 | -12 | 41 | 24 | 0 | 22 | 12 -38 |
| 0 | -1 | -9 | 8 | 21 | 36 | -53 | 36 | -48 | 16 | 2 | -20 | -3 | -3 | 42 | -22 | 63 | -38 | 42 | 50 | 50 | -36 | -5 | -18 | 9 | -1 | 0 | -20 | 6 | 20 | -15 35 |
| -39 | -26 | -8 | -44 | 18 | 24 | 10 | -11 | -41 | -2 | -36 | 8 | 1 | 29 | -36 | 53 | 11 | -29 | -1 | -33 | -5 | 25 | -49 | 3 | 0 | 18 | -17 | -12 | 22 | 5 | -18 5 |
| 63 | 19 | 59 | -13 | -58 | 3 | 1 | 18 | -8 | 36 | 5 | -23 | 29 | -66 | -3 | -34 | -13 | 1 | -12 | -38 | -30 | 29 | 75 | -46 | -2 | 6 | -20 | 28 | -15 | 39 | 10 0 |
| -59 | -3 | 0 | 64 | -2 | 3 | 12 | -30 | 32 | -34 | 15 | 27 | -21 | 31 | 0 | -28 | 47 | -66 | -2 | 18 | 47 | -39 | 38 | -35 | 6 | 5 | 2 | -42 | -2 | 43 | -78 -22 |
| -14 | -36 | -14 | 1 | -41 | -14 | 15 | -8 | -35 | 21 | 22 | -34 | 73 | -21 | 29 | 3 | 57 | -5 | 27 | 53 | 21 | -17 | -44 | 26 | 9 | 0 | 20 | -38 | -11 | 40 | -9 46 |
| -1 | 19 | -18 | 11 | 51 | 14 | 22 | 23 | -52 | -2 | -2 | 10 | -30 | -1 | -5 | -36 | -72 | -26 | -38 | -29 | -6 | -41 | 29 | 20 | -19 | 49 | -30 | 5 | 3 | -14 | 31 40 |
| -15 | 45 | -26 | -35 | -47 | -20 | 60 | -3 | -9 | -3 | -7 | 17 | 22 | -33 | -11 | 40 | 5 | 30 | 27 | 4 | 7 | 21 | -8 | 9 | -36 | 37 | -21 | -27 | 25 | -18 | 19 -37 |
| 0 | -5 | 18 | -3 | 13 | 2 | -29 | -31 | 58 | -27 | -17 | 14 | 41 | -6 | -53 | 25 | 3 | 79 | 11 | -1 | -26 | 12 | -1 | 11 | -5 | 4 | 7 | 6 | -15 | -25 | 26 -51 |
| 56 | -37 | -5 | 0 | 35 | 34 | -18 | -26 | 4 | 20 | -5 | 16 | 24 | 23 | 0 | 19 | -10 | -17 | -25 | -7 | 9 | 7 | -19 | 4 | -1 | -11 | -42 | 57 | 27 | -1 | -8 -31 |
| 15 | 28 | -33 | -1 | -17 | 10 | -17 | 0 | 3 | -1 | -4 | -18 | -4 | -34 | 27 | -13 | -55 | 45 | -27 | 7 | -33 | 8 | -5 | 36 | -3 | 1 | 0 | -23 | -30 | 24 | 12 68 |
| 13 | -14 | -46 | 32 | 7 | -2 | -21 | 10 | 33 | -16 | 1 | -29 | -12 | -32 | 17 | -12 | 15 | 13 | -32 | 1 | 2 | -11 | 34 | -12 | 21 | -21 | -17 | 17 | 3 | -49 | -33 1 |
| 53 | 16 | -2 | -2 | 58 | 11 | -26 | -6 | -1 | 15 | 6 | 10 | 22 | 32 | 5 | -11 | -8 | -24 | 1 | 20 | -16 | -25 | 7 | 44 | -2 | -41 | 46 | -25 | 38 | -35 | -30 49 |
| 0 | -37 | 28 | 12 | -14 | -29 | 26 | -7 | 5 | -14 | -23 | 33 | -31 | -9 | 31 | 10 | 6 | -9 | 14 | 53 | -29 | 37 | -42 | -28 | -28 | 23 | 19 | -20 | 69 | 0 | 23 63 |
| -38 | 11 | -32 | 5 | -5 | -5 | 12 | 4 | -9 | 7 | 21 | -49 | 48 | -19 | -19 | -8 | -28 | -20 | -17 | 7 | 47 | -6 | 6 | -20 | 57 | -19 | -7 | -20 | 7 | -10 | -5 2 |
| 21 | -6 | 14 | -27 | 7 | 34 | -27 | -31 | 33 | -25 | 13 | 37 | -51 | -16 | 64 | -36 | 28 | 36 | 10 | -26 | -15 | -23 | 0 | -16 | -15 | 43 | -29 | -36 | -27 | -8 | -2 17 |
| 7 | 18 | -32 | -8 | -26 | -13 | 32 | -33 | -13 | 22 | 47 | 18 | -4 | -21 | 34 | -27 | -2 | -11 | 14 | 15 | 26 | 5 | 5 | 63 | -52 | 14 | -18 | 3 | -11 | 13 | 4 -8 |

FIG. 3A

| -30 | 0 | -2 | -13 | 56 | -47 | -27 | -26 | 17 | -7 | 20 | 21 | -22 | 23 | -7 | -71 | 26 | -24 | -8 | 30 | -3 | -52 | -15 | -32 | -73 | 84 | 27 | 29 | -34 | -7 | -15 39 |
|---|---|---|---|---|---|---|---|---|---|---|---|---|---|---|---|---|---|---|---|---|---|---|---|---|---|---|---|---|---|---|
| 7 | 10 | -24 | 25 | -24 | 36 | 6 | 20 | 35 | -20 | -53 | -21 | 25 | 42 | 35 | -37 | -10 | -2 | 2 | -23 | 1 | 13 | 46 | 21 | -23 | -15 | 11 | 5 | -16 | 37 | -1 0 |
| 23 | 13 | -37 | 17 | -11 | -4 | -4 | 29 | -31 | 4 | 6 | 24 | -9 | -27 | 7 | 40 | -10 | 31 | 16 | -8 | 2 | -13 | 1 | 6 | 47 | -33 | 37 | -46 | -36 | 20 | -10 -45 |
| -50 | 16 | -31 | 5 | -39 | 5 | -2 | -45 | 42 | 21 | 0 | -18 | -35 | 8 | -28 | 37 | 18 | -33 | -7 | 8 | -46 | 9 | -13 | -15 | 21 | 3 | -50 | 32 | 48 | -51 | 2 34 |
| 17 | -62 | 69 | -3 | 11 | 5 | -12 | -9 | 5 | 12 | 0 | -8 | 36 | 27 | -4 | 7 | -5 | -19 | 41 | 1 | 51 | -25 | 65 | -2 | -1 | 16 | 1 | 0 | 17 | 16 | -24 8 |
| 25 | 49 | -17 | 0 | 34 | 2 | -3 | 10 | 42 | -17 | 6 | -51 | -7 | 28 | -36 | -28 | -5 | 5 | 27 | -35 | -6 | 2 | -26 | -19 | 2 | -12 | 14 | 19 | -34 | 56 | -83 -28 |
| 35 | -47 | 15 | -18 | 2 | -2 | -11 | 21 | -29 | -11 | -5 | 24 | 9 | 9 | -54 | 6 | -25 | -77 | 4 | 30 | -38 | -30 | -3 | 15 | 5 | -53 | -12 | 3 | 4 | 17 | 41 -13 |
| -40 | -1 | -4 | 43 | -20 | 13 | -22 | -55 | 17 | -56 | 59 | -10 | 17 | -10 | -2 | 94 | -34 | -16 | 1 | -19 | 0 | 29 | -28 | 31 | -10 | 45 | -28 | 3 | 27 | -48 | -19 -2 |
| 44 | 3 | -19 | -46 | 9 | -24 | 25 | 24 | 35 | -26 | 5 | -2 | -28 | -23 | 11 | 10 | 7 | -10 | -4 | 17 | 28 | -6 | -38 | -4 | 35 | -50 | -6 | -2 | -11 | 51 | 1 -20 |
| 10 | -38 | -2 | -7 | 26 | 37 | 6 | 27 | 7 | -19 | 17 | 57 | -9 | 45 | 18 | -1 | -10 | -1 | -1 | -15 | 26 | 21 | 60 | -4 | -38 | 47 | -10 | -39 | 5 | -30 | 8 -43 |
| 15 | 15 | 50 | -8 | 3 | -3 | 2 | -46 | -27 | -32 | 4 | -30 | -6 | -62 | 14 | -1 | -31 | 20 | -22 | -9 | 16 | -44 | -9 | 0 | -4 | 31 | 36 | -16 | 3 | 41 | 18 10 |
| 22 | -20 | -21 | -34 | 13 | -37 | -42 | 4 | 29 | 29 | -18 | 0 | 54 | -7 | 0 | 37 | -3 | 8 | 28 | 27 | -33 | -12 | 14 | -34 | -30 | -27 | 86 | -14 | 37 | -46 | -5 1 |
| -29 | 23 | -12 | 41 | 31 | 36 | 19 | -27 | -37 | -6 | -39 | -6 | 10 | -16 | 8 | -35 | -2 | 18 | -23 | -10 | -17 | 12 | 42 | 34 | -35 | -26 | 13 | -3 | 0 | -18 | -3 4 |
| -6 | -31 | -33 | -12 | -51 | -9 | 4 | -19 | 35 | -2 | 25 | 37 | 36 | 23 | -7 | 28 | -8 | -44 | -39 | 34 | 46 | 3 | 21 | 11 | 2 | 2 | 9 | -44 | 34 | 10 | -6 -32 |
| -26 | 26 | 25 | 28 | -6 | 34 | 7 | -18 | 13 | 36 | -24 | 3 | -24 | -40 | 12 | 14 | -6 | -1 | 5 | 23 | -26 | -37 | 27 | -72 | 23 | -4 | -3 | -14 | 5 | 18 | 0 15 |
| -14 | -2 | -18 | -15 | 3 | 22 | 54 | -78 | -2 | 15 | -15 | -22 | 10 | -45 | 36 | 15 | -3 | -20 | -12 | 7 | -18 | -3 | -16 | 63 | -51 | 44 | 18 | -7 | 1 | 53 | 9 -1 |
| -25 | 43 | -28 | -35 | 42 | -26 | 0 | 5 | 25 | 35 | -27 | 18 | 20 | -14 | 25 | -14 | 28 | 26 | -7 | -37 | 7 | 35 | -6 | -22 | -23 | 9 | -54 | -19 | -17 | 9 | -51 -15 |
| 0 | 26 | 22 | 14 | -14 | 26 | 38 | -34 | 0 | -42 | -37 | 3 | 12 | -47 | -1 | -42 | 7 | 17 | 14 | -21 | -40 | -12 | 0 | -2 | 12 | 36 | 41 | 0 | 2 | 15 | -6 -7 |
| 12 | 4 | 9 | 28 | -55 | -27 | 1 | -25 | 23 | 14 | -59 | 54 | -3 | 47 | 34 | -2 | -39 | 16 | 30 | -9 | 29 | 53 | 7 | -6 | 15 | -22 | 6 | -2 | 11 | -11 | 29 -23 |
| -5 | 5 | -22 | -33 | -7 | 31 | -27 | 57 | -3 | 5 | 16 | 12 | 0 | -3 | 6 | -26 | 11 | 10 | -48 | -3 | 38 | 21 | -64 | 38 | -4 | -28 | 33 | -50 | -26 | -6 | -6 12 |
| -17 | 11 | 27 | 30 | -47 | 3 | 23 | -19 | -5 | -4 | -53 | 3 | 26 | -47 | 31 | 65 | -18 | -38 | 22 | -10 | -22 | 10 | 18 | -20 | -5 | -11 | -18 | 8 | -37 | -15 | 36 12 |
| -4 | -48 | -7 | -9 | 62 | -15 | -10 | -35 | 18 | 46 | 18 | 0 | 7 | -21 | -38 | -32 | 25 | -10 | -23 | 26 | -8 | -1 | -13 | -3 | 3 | 39 | 48 | 32 | 6 | 21 | -50 11 |
| 31 | -10 | -27 | 43 | 13 | -3 | 2 | 2 | -22 | 21 | 7 | -29 | -20 | -38 | -9 | -14 | 29 | -44 | 56 | 6 | -35 | 46 | -77 | -23 | 59 | -13 | -32 | 28 | -34 | 76 | 16 -1 |
| 12 | 12 | 5 | 5 | -47 | 3 | 20 | -35 | -9 | 18 | -46 | 0 | 40 | 27 | 35 | 1 | 1 | 26 | 14 | 6 | 14 | 4 | -11 | 19 | -9 | 0 | -25 | -16 | -17 | -39 | -4 16 |
| 6 | -18 | 29 | -23 | -54 | -7 | 48 | 7 | -34 | 37 | 59 | 15 | 0 | 24 | 1 | 30 | 8 | -49 | -27 | 37 | -30 | 6 | 19 | -19 | 45 | 1 | -29 | 38 | -6 | 3 | -16 37 |
| 10 | -28 | 41 | 0 | 50 | -22 | 11 | 34 | -3 | -41 | -47 | -60 | 9 | -52 | 24 | 18 | -24 | -14 | 12 | -12 | 0 | -23 | -19 | -28 | 26 | -37 | 23 | -4 | 1 | -5 | 22 20 |
| -14 | -25 | 13 | -24 | -6 | 41 | -26 | -22 | 10 | 26 | 27 | -13 | -11 | 34 | 11 | -4 | -37 | 7 | -8 | 45 | -16 | 43 | 4 | 53 | -1 | 7 | 22 | 9 | 11 | -6 | 14 44 |
| 28 | -28 | -50 | -9 | 15 | 26 | -17 | 18 | -1 | 36 | 34 | -18 | -23 | 19 | -29 | 27 | -36 | 29 | 4 | -9 | -24 | 32 | -32 | -28 | 71 | -10 | -44 | -95 | -27 | 5 | -26 -22 |
| -7 | 0 | -37 | 60 | 2 | -24 | -6 | -18 | -15 | -49 | -33 | -27 | -18 | 8 | 5 | 0 | -32 | 54 | -1 | -19 | -7 | 22 | -20 | 27 | -45 | -10 | 22 | 57 | 26 | -2 | -11 -23 |
| -57 | 15 | 44 | -46 | -22 | 24 | -24 | 32 | 18 | 37 | 30 | 56 | 26 | 18 | -31 | 19 | -23 | 6 | 14 | -21 | -20 | -38 | 54 | 11 | -34 | -18 | 4 | 30 | -8 | -1 | 2 -21 |
| 8 | -15 | 47 | -13 | -2 | 4 | 37 | 4 | -21 | -33 | -30 | -5 | -23 | 42 | -56 | -1 | 6 | -12 | -25 | 0 | 20 | 12 | -45 | 3 | -43 | 19 | 33 | -60 | 16 | 23 | 23 11 |
| -3 | -21 | -15 | 22 | -2 | 6 | -10 | -33 | 21 | -5 | 6 | -13 | -23 | 4 | 9 | 35 | -3 | -10 | -6 | 42 | 28 | 22 | -1 | 0 | 23 | 39 | 5 | -9 | 18 | -74 | 9 -3 |

FIG. 3B

| -21 | -25 | 20 | 42 | 30 | -4 | 5 | -43 | 6 | -27 | 16 | -7 | -24 | -7 | -6 | -13 | 41 | -11 | -6 | 21 | -22 | -42 | 14 | 5 | 20 | 41 | -1 | 4 | 23 | 20 | -21 -43 |
|---|---|---|---|---|---|---|---|---|---|---|---|---|---|---|---|---|---|---|---|---|---|---|---|---|---|---|---|---|---|---|
| 4 | 88 | -10 | -57 | 1 | -8 | 0 | -6 | 33 | -14 | -11 | -24 | 22 | -23 | -11 | 32 | -48 | -52 | 26 | -3 | 0 | -13 | -2 | -27 | -41 | 12 | -13 | -5 | 39 | 30 | 4 -28 |
| -68 | 4 | -3 | 5 | 6 | 46 | 30 | 5 | 8 | -32 | 11 | -7 | 38 | 65 | -23 | -26 | 22 | 56 | -8 | 56 | -19 | -12 | 14 | 7 | 24 | -40 | -43 | 61 | 6 | 6 | 9 -7 |
| 20 | -46 | -8 | -26 | 10 | -38 | -11 | 3 | 56 | -53 | 21 | -17 | -27 | 18 | -28 | 32 | 20 | -7 | -43 | -32 | 7 | -4 | 29 | -45 | -7 | -3 | -43 | 34 | -30 | -56 | 5 15 |
| -22 | -28 | 19 | 26 | -8 | -20 | -9 | 31 | 30 | -14 | 15 | 27 | -10 | -40 | -8 | -43 | -41 | 54 | -52 | 26 | 33 | 12 | 4 | 4 | 26 | 28 | -2 | 7 | -14 | -9 | 33 -51 |
| -8 | 22 | 11 | 30 | 9 | 1 | 1 | -13 | -4 | -29 | -10 | 20 | 46 | 19 | -22 | 51 | 8 | -12 | -1 | -7 | -14 | -8 | -17 | 31 | 9 | -8 | 37 | 6 | -4 | 48 | 6 2 |
| -11 | 16 | -37 | 20 | -45 | 5 | -15 | 0 | 28 | 13 | -11 | -52 | 22 | 14 | -1 | -45 | 40 | 17 | -23 | 51 | -14 | -16 | 39 | 35 | -26 | -48 | 35 | 1 | 28 | -40 | -24 8 |
| 5 | -7 | 9 | -44 | 34 | 69 | -5 | -99 | 23 | -11 | -27 | -6 | -18 | 0 | 25 | 6 | -20 | -33 | 75 | -11 | -26 | -28 | -6 | -5 | -27 | -41 | -14 | -12 | 10 | -10 | 24 -18 |
| 3 | 38 | -7 | -23 | 21 | 5 | -33 | -21 | 15 | 20 | 33 | -2 | 42 | -22 | -33 | -5 | 44 | -23 | -20 | -23 | 22 | 46 | -40 | 66 | -39 | -2 | -14 | 23 | -16 | 0 | -11 30 |
| -25 | 1 | 13 | -3 | -31 | 0 | -7 | 58 | -9 | 27 | 0 | 3 | 9 | -24 | 21 | -21 | -1 | 17 | 1 | 4 | 7 | -41 | -18 | 11 | -33 | 14 | 16 | 28 | -16 | 16 | 7 -21 |
| 24 | 30 | 21 | -57 | -23 | 7 | -17 | 52 | 34 | -7 | -52 | 58 | 4 | -31 | -5 | 7 | 23 | -16 | 26 | -3 | 53 | -16 | 54 | 40 | -4 | 11 | -33 | 37 | -23 | 53 | -9 26 |
| -32 | -6 | 3 | 11 | 44 | 31 | -36 | 5 | -77 | -11 | -21 | -23 | -12 | -7 | 12 | -15 | -5 | -1 | -21 | -22 | -54 | -19 | 18 | 8 | -16 | 22 | 12 | 12 | -65 | 33 | 4 -41 |
| 28 | -2 | 19 | -45 | 27 | -20 | -40 | 10 | -7 | 67 | -57 | 22 | 50 | 15 | -23 | 40 | 6 | -9 | -3 | -20 | -15 | -4 | -4 | -24 | -15 | 35 | -40 | -6 | -37 | -31 | -8 4 |
| 9 | -17 | -16 | -60 | 29 | 19 | 30 | 34 | -34 | 7 | -6 | 13 | 11 | -28 | 19 | 25 | -16 | 24 | -21 | 47 | 4 | 53 | -27 | -43 | -47 | 66 | 7 | 0 | -27 | 1 | 43 -28 |
| -4 | 42 | 0 | -17 | 30 | -24 | -4 | 22 | -17 | 15 | 52 | -7 | -55 | -2 | 15 | -21 | -44 | -21 | -10 | -53 | 41 | 14 | 67 | -10 | -31 | 1 | -38 | 34 | 38 | 44 | -8 2 |
| -38 | -21 | 25 | 15 | 24 | -4 | -45 | -22 | -18 | -17 | 1 | -1 | 7 | 21 | -41 | 10 | 36 | 41 | 42 | 1 | -43 | -17 | 24 | 27 | 47 | 30 | 21 | 30 | -90 | 24 | 11 -10 |
| -36 | -36 | 45 | 27 | -10 | 47 | 4 | 15 | 17 | -30 | 20 | -28 | -14 | 24 | 22 | -5 | 1 | -30 | -15 | -13 | -13 | 14 | -5 | -61 | -48 | -46 | 8 | -77 | 4 | 17 | 2 -5 |
| 35 | -3 | -49 | -30 | -31 | 25 | -19 | 42 | -11 | 21 | 5 | -29 | -1 | 1 | -36 | -13 | 2 | 28 | 4 | -1 | 13 | -16 | 10 | 2 | 2 | 14 | -29 | -1 | 27 | 17 | -21 -20 |
| -3 | -21 | 39 | 13 | -1 | -31 | 12 | 9 | 4 | -38 | -22 | 44 | 36 | 9 | -4 | 2 | -5 | 11 | 22 | 21 | 10 | -3 | 25 | 33 | 14 | -7 | 19 | 11 | 9 | 4 | -16 -8 |
| 3 | -33 | -2 | 45 | -6 | -19 | 5 | -2 | 25 | 31 | -63 | 40 | -17 | 53 | 9 | -34 | 4 | -17 | 0 | 3 | -45 | -17 | -16 | 0 | 2 | 36 | -42 | -33 | -33 | 10 | 5 -5 |
| -17 | -20 | 57 | -19 | 0 | -30 | 6 | 0 | 4 | -1 | -8 | -5 | -52 | -19 | 35 | -53 | -1 | -1 | -37 | 29 | -16 | -18 | 4 | -34 | 7 | -28 | 34 | 12 | -22 | -6 | 28 -13 |
| -28 | -27 | -8 | 24 | 5 | -28 | 8 | -28 | 22 | -46 | 40 | 24 | -1 | 19 | 7 | 24 | 22 | 9 | -14 | 16 | 31 | 39 | 44 | -11 | 28 | -22 | -47 | 31 | 11 | 0 | 34 -45 |
| 42 | 5 | -34 | -32 | 58 | 0 | -5 | 2 | 24 | 9 | -3 | -10 | -27 | -20 | -16 | 8 | 14 | 14 | 29 | -61 | 19 | -14 | 11 | -15 | -5 | 8 | -15 | 26 | -3 | 16 | -25 -20 |
| 47 | 21 | 4 | -49 | 32 | 9 | -41 | 17 | 58 | -33 | 0 | -22 | 26 | 13 | 19 | 19 | 0 | -14 | -27 | 8 | -29 | 24 | -16 | -41 | 8 | -12 | 10 | 33 | -33 | 21 | -37 -11 |
| -3 | 24 | 9 | -27 | -10 | 2 | 25 | -18 | -71 | 31 | 22 | -16 | 25 | -2 | -65 | 39 | -34 | 53 | 15 | -2 | -22 | 4 | 14 | 14 | 38 | -16 | 14 | -14 | 1 | 15 | 19 13 |
| -5 | 12 | -41 | 11 | -1 | 24 | -31 | 10 | 1 | -18 | -16 | -5 | 10 | 16 | -17 | -27 | 2 | -29 | 12 | -12 | 52 | -10 | 0 | -3 | -4 | 35 | -69 | 26 | 8 | -41 | 29 -38 |
| 3 | -28 | -16 | 21 | 33 | 20 | 14 | -53 | 42 | -4 | -17 | 76 | -29 | 0 | -9 | -3 | 44 | 14 | -17 | -9 | -13 | -42 | 16 | -5 | 43 | -46 | 2 | 11 | -37 | 40 | -8 -51 |
| 4 | -6 | 14 | 22 | -35 | 14 | -8 | 10 | 36 | 16 | -12 | -51 | -14 | 15 | -9 | -69 | 26 | -2 | 4 | -51 | 0 | 21 | 21 | -2 | 26 | 14 | -27 | -8 | 11 | 11 | -24 16 |
| 14 | 12 | -16 | -49 | -39 | -16 | 32 | 16 | -17 | -5 | 8 | -34 | 30 | 50 | -7 | -41 | 11 | 21 | 27 | 64 | -25 | 0 | -9 | -46 | -38 | 8 | -3 | 39 | 14 | 1 | 27 -15 |
| -4 | -29 | 28 | 12 | 73 | -21 | -21 | -17 | -1 | 25 | 7 | 28 | -31 | 23 | -38 | 30 | -7 | -32 | -27 | -19 | 24 | 19 | 22 | -1 | 49 | 5 | -23 | 2 | 10 | 13 | -22 40 |
| -8 | -3 | -34 | 8 | 14 | 20 | -4 | -7 | -6 | 17 | -21 | -60 | -33 | 64 | -18 | 12 | -11 | 34 | -39 | -14 | -12 | -14 | 7 | 29 | -30 | -12 | 8 | 30 | -37 | -33 | -40 -5 |
| -13 | 42 | 9 | 27 | -17 | -5 | -43 | 0 | 27 | 4 | 39 | -42 | 65 | -1 | -9 | 14 | 35 | 19 | 7 | -18 | 6 | 26 | -45 | 6 | -16 | -5 | 3 | 8 | 17 | 50 | 17 33 |

FIG. 3C

| | | | | | | | | | | | | | | | | | | | | | | | | | | | | |
|---|---|---|---|---|---|---|---|---|---|---|---|---|---|---|---|---|---|---|---|---|---|---|---|---|---|---|---|---|
| -3 | 10 | 21 | -8 | -11 | 2 | -7 | -32 | -1 | 24 | 6 | 16 | 11 | 35 | -27 | 28 | -14 | -33 | 22 | 28 | -1 | -14 | -11 | 16 | -29 | 18 | -18 | -11 | 4 | -19 | 35 -6 |
| 5 | 17 | -12 | -21 | 37 | 23 | 56 | -21 | -22 | -3 | -5 | 14 | -17 | 4 | -24 | -37 | 48 | -10 | -14 | -41 | -15 | -32 | -3 | 34 | 13 | 12 | -57 | 16 | 36 | 41 | -42 -10 |
| -36 | 49 | 37 | -12 | -54 | 27 | 24 | -10 | -9 | -29 | 16 | 2 | 20 | -12 | 4 | 41 | 27 | 28 | -64 | 44 | 6 | 21 | 24 | -1 | -6 | 1 | 5 | 13 | 8 | 2 | 58 -7 |
| 21 | -19 | 16 | -24 | -19 | -29 | -7 | 6 | -15 | 36 | 3 | -3 | -5 | -30 | 19 | -24 | -2 | 6 | -4 | 48 | 99 | 35 | -10 | -11 | -23 | -14 | -19 | 3 | -15 | 5 | 10 0 |
| 17 | -33 | 4 | -34 | 20 | -6 | 44 | -19 | 4 | 22 | -38 | 4 | -12 | 13 | -8 | 46 | -22 | -23 | 40 | 15 | -20 | 29 | -28 | 15 | -35 | 61 | -16 | -16 | 35 | -15 | -7 -7 |
| -14 | 20 | 31 | -48 | 44 | 37 | -41 | 20 | 0 | 12 | 25 | -27 | -16 | 4 | 3 | -27 | -2 | -7 | -48 | -23 | 11 | -1 | 42 | -8 | -27 | 6 | -3 | 0 | -10 | -86 | 37 -12 |
| 10 | -4 | 18 | 23 | 46 | -45 | 5 | -7 | 22 | -8 | -4 | -10 | 17 | 33 | 7 | -12 | 11 | 23 | 9 | -1 | 14 | -36 | -32 | 38 | 44 | 21 | -34 | 20 | 42 | -20 | -38 0 |
| -27 | -3 | -12 | 0 | -24 | 5 | 3 | -39 | -31 | -15 | 23 | -16 | 0 | 22 | -14 | -7 | -14 | -61 | -1 | 29 | -12 | 18 | -11 | 13 | -32 | -2 | 1 | 12 | 45 | 22 | 14 24 |
| -12 | 55 | -81 | 18 | -82 | 15 | 33 | -77 | 42 | 1 | 14 | -22 | -1 | 6 | 19 | 1 | 50 | 33 | 51 | -15 | 8 | 8 | -15 | -17 | 32 | -16 | 20 | -9 | -67 | -23 | -5 21 |
| -11 | 8 | 26 | -35 | 70 | -12 | -8 | 9 | 21 | 11 | -11 | -40 | 24 | -29 | 12 | 17 | -22 | 35 | -50 | -29 | 1 | -7 | 5 | 16 | -13 | -53 | -2 | -25 | 10 | 4 | 75 -81 |
| -13 | -9 | 63 | -1 | -33 | 29 | 22 | 42 | -12 | -22 | 1 | 9 | 14 | 1 | -35 | -9 | -84 | 5 | 28 | 13 | -8 | -12 | 8 | 23 | 9 | -43 | 42 | 17 | -14 | 16 | 11 14 |
| -19 | 7 | -17 | 49 | 8 | -27 | -2 | 46 | -7 | 8 | 22 | 3 | -48 | 10 | 45 | 37 | -4 | -10 | -30 | 34 | 0 | -27 | -77 | -39 | 7 | 46 | 11 | -12 | 12 | -6 | -26 10 |
| 33 | 0 | 0 | -21 | -39 | 7 | -20 | -20 | -18 | 3 | -26 | 6 | 61 | -14 | 8 | -35 | 16 | 12 | 8 | 36 | -37 | 38 | -13 | -29 | 0 | -36 | -14 | 46 | -2 | -28 | 0 4 |
| 35 | 67 | -69 | -9 | -22 | 55 | -15 | 16 | 28 | -52 | -15 | -11 | 24 | -20 | -49 | -25 | 43 | -47 | 35 | -9 | -25 | 31 | -30 | 6 | 17 | -64 | -32 | -17 | 14 | 20 | -11 49 |
| -46 | 0 | 27 | -5 | 0 | 19 | -2 | 27 | -21 | 3 | 39 | 12 | 11 | -12 | 33 | 23 | -33 | 42 | -39 | 36 | -19 | -28 | -6 | 22 | 68 | 1 | -31 | 2 | 32 | -10 | -36 -44 |
| -4 | -23 | 11 | 28 | -18 | -9 | -31 | -24 | -14 | 7 | -1 | -6 | 21 | -31 | -66 | 11 | 29 | 7 | -17 | 15 | -3 | -7 | -24 | -17 | 16 | 9 | 34 | 6 | -24 | -13 | 69 24 |
| -31 | -19 | 23 | -5 | -4 | 12 | -29 | 11 | -11 | -20 | -28 | -14 | 26 | 37 | 34 | -2 | -14 | 9 | -19 | -41 | -7 | 41 | 18 | 61 | -18 | 22 | -9 | -22 | 26 | -12 | -21 -16 |
| 8 | 4 | 36 | 59 | -22 | 5 | 100 | -43 | 62 | 5 | -9 | 8 | -17 | -10 | 17 | 45 | -25 | 14 | -2 | 51 | 24 | -57 | -29 | -3 | 9 | -99 | 10 | 10 | -1 | -9 | -11 16 |
| 3 | 8 | -15 | -68 | -9 | 21 | 31 | -31 | 6 | -52 | -9 | 36 | 17 | -2 | -21 | -30 | -32 | 20 | -58 | 8 | 16 | -28 | 30 | 9 | -64 | 30 | 25 | 5 | 7 | -19 | 19 -8 |
| 7 | 19 | 61 | -33 | -14 | -48 | 23 | -28 | -7 | 0 | 11 | 20 | -42 | 1 | -2 | 9 | -24 | 47 | 5 | 1 | 39 | 8 | 15 | -30 | 59 | -14 | 20 | -23 | 6 | 15 | 28 -6 |
| 33 | -6 | -37 | 12 | 29 | 21 | -3 | 26 | 2 | -1 | 24 | 33 | -11 | 0 | 10 | 19 | -20 | 0 | -26 | -30 | 11 | 1 | -29 | 30 | -8 | -3 | 4 | 13 | -4 | 14 | 5 -9 |
| 22 | 0 | -53 | 70 | -79 | -17 | -54 | 0 | 13 | 15 | -36 | -3 | -3 | 21 | 7 | 6 | 27 | 4 | 4 | 2 | -99 | 18 | 8 | -30 | 3 | -28 | -26 | 21 | -4 | 16 | 15 11 |
| 1 | 21 | 5 | -25 | 4 | 26 | 32 | 12 | -8 | -9 | -2 | -1 | -26 | 28 | -45 | -33 | -4 | -19 | -21 | -3 | -18 | 35 | -59 | 19 | 30 | 12 | -35 | -21 | 11 | -55 | 18 -24 |
| -49 | 12 | 0 | 12 | 16 | 35 | -18 | -36 | 36 | -34 | 11 | 19 | 7 | -25 | 68 | -3 | 14 | 29 | 34 | 23 | 11 | -2 | -48 | 18 | 24 | 7 | 29 | 6 | 4 | 5 | -40 -31 |
| 50 | -3 | 3 | 9 | 2 | -28 | -20 | 18 | 12 | -43 | 17 | -21 | 18 | 33 | 8 | -14 | -24 | -5 | -3 | -5 | -20 | 21 | 61 | -55 | 1 | -6 | -15 | 15 | 7 | 74 | 0 -27 |
| 7 | 37 | 31 | -6 | 9 | -28 | 1 | 4 | 51 | 8 | 51 | -41 | -9 | -26 | -45 | 14 | -10 | -13 | -39 | -4 | 64 | -23 | 22 | -56 | 16 | -2 | -27 | -10 | -3 | 0 | -7 -23 |
| 33 | -50 | -33 | -16 | 10 | 5 | -11 | -13 | -3 | -2 | 7 | -12 | -94 | 44 | 63 | -18 | 4 | 10 | 25 | -9 | -31 | 7 | 4 | -13 | 10 | -5 | -3 | 39 | -30 | 7 | -21 50 |
| 30 | 1 | -52 | 9 | -12 | 53 | 22 | -10 | -31 | 0 | -59 | 53 | 13 | 28 | -16 | -19 | 32 | -27 | -44 | -35 | 29 | 20 | -8 | -6 | 21 | 0 | 5 | 18 | 0 | -25 | 2 -44 |
| -18 | 38 | 18 | -15 | 0 | 34 | -46 | -2 | -8 | 30 | -19 | -9 | 41 | 16 | 23 | -35 | 32 | 7 | 12 | 30 | -10 | -11 | 22 | -37 | 14 | 32 | -31 | -18 | 2 | 1 | -4 16 |
| -53 | -16 | -5 | -2 | -3 | -10 | 19 | -24 | 32 | -14 | 53 | 35 | -20 | 19 | -30 | -29 | 20 | -12 | 20 | 28 | -19 | 13 | 1 | -71 | 31 | -24 | 32 | -26 | -4 | 36 | -36 36 |
| 26 | 12 | -8 | 0 | 48 | 9 | 5 | 0 | -12 | 0 | -26 | -56 | 1 | 7 | -49 | 15 | 17 | -56 | 10 | -9 | 4 | -18 | 26 | 42 | -5 | -33 | 45 | 16 | 35 | -23 | -1 -38 |
| 37 | 24 | 9 | 51 | -93 | -11 | 25 | 5 | -2 | -10 | -56 | 31 | 22 | -15 | 33 | -7 | 9 | 2 | 41 | 38 | -20 | -20 | 35 | 16 | -22 | -3 | 1 | 9 | -32 | -6 | 9 -26 |

FIG. 3D

METHOD FOR GENERATING A DISPERSED MESSAGE FOR DATA EMBEDDING

The Federal Government shall have a nonexclusive, non-transferable, irrevocable, paid-up license to practice or have practiced for or on behalf of the United States the subject invention throughout the world. Invention made under Government Agreement No. F30602-99-2-0541.

FIELD OF THE INVENTION

The invention relates generally to the field of embedding and extracting hidden messages in source data. This field is also referred to as data hiding, information hiding, watermarking and also steganography. More specifically the invention relates to the generation of a dispersed message for embedding in a digital image in a camera or printer.

BACKGROUND OF THE INVENTION

U.S. Pat. No. 6,044,156 issued Mar. 28, 2000 to Honsinger et al. entitled Method For Generating An Improved Carrier For Use In An Image Data Embedding Application, discloses a technique for embedding messages in digital image data. This method for embedding a hidden message into a digitized image includes the steps of: forming a digitized version of the desired message; generating a random phase carrier; convolving the digitized version of the desired message and the random phase carrier to form a dispersed message; and combining the dispersed message with the digitized image to form an embedded hidden message image. Hidden messages may be embedded in photographic images recorded on film and paper using conventional photographic printing techniques, or they may be embedded in images produced on printers such as ink jet and thermal dye transfer printers, by combining the dispersed message with a digital image using digital image processing techniques.

The hidden messages are recovered from the embedded hidden message image by cross correlating the embedded hidden message image containing the dispersed message with a decoding carrier to recover the embedded dispersed message; and extracting the digital message data from the recovered dispersed message.

One problem with the above described techniques is that when a digital image is formed in an apparatus such as a camera or a printer, the complex computer processing capability needed for forming the dispersed message is not present in the apparatus although the apparatus will generally include a simple computer suitable for basic digital image processing and machine control. There is a need therefore for a simpler method of forming the dispersed message.

SUMMARY OF THE INVENTION

The need is met according to the present invention by providing a method for forming a dispersed message for embedding in an image, that includes the steps of: providing a random phase carrier; defining a set of ordered bit locations; assigning a polarity to each bit location corresponding to a bit of the message; cyclically shifting the random phase carrier in accordance with each bit location and weighting the cyclically shifted carriers by the polarity of the corresponding bit; and forming a sum of the cyclically shifted weighted carriers to form the dispersed message.

The method of the present invention has the advantage of requiring very little image processing capability for implementation, and is therefore suitable for use in apparatus such a digital camera or printer.

DETAILED DESCRIPTION OF THE INVENTION

Figures 1, 3:
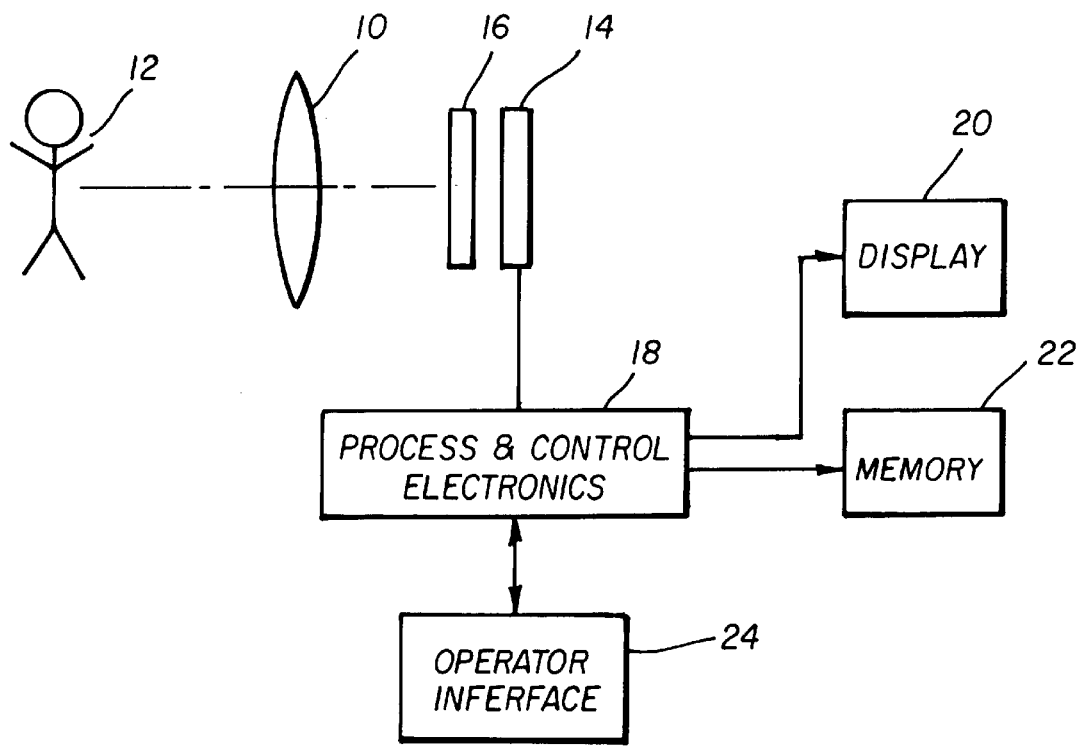
FIG. 1 is a block diagram showing a typical digital camera configuration useful for practicing the method of the present invention.
FIG. 3 is a table showing a 64×64 pixel carrier according to the present invention.

Referring to FIG. 1 a digital camera useful for practice of the present invention includes a lens 10 for forming an image a subject 12 onto a solid state image sensor 14. The image sensor 14 may include a color filter array 16. The image signals produced by the image sensor 14 are processed in process and control electronics 18, which is generally embodied as a microprocessor having limited memory storage and data processing capability. Image processing carried out by the process and control electronics 18 includes data formatting, color interpolation, image enhancement and data compression. The processed digital image can be displayed on a display screen 20, or stored in a digital image memory 22, such as a magnetic storage device, or solid state memory chip.

An operator interface 24 includes camera controls, and data input means such as a physical keyboard, or a virtual keyboard provided via a touch sensitive screen over the display screen 20 whereby the operator can enter a message that will be embedded in the image data recorded by the camera. Alternatively, a message, such as a current date, can be generated by the process and control electronics 18. The camera may include sensors such as a global position sensor for generating message data.

Figure 2:
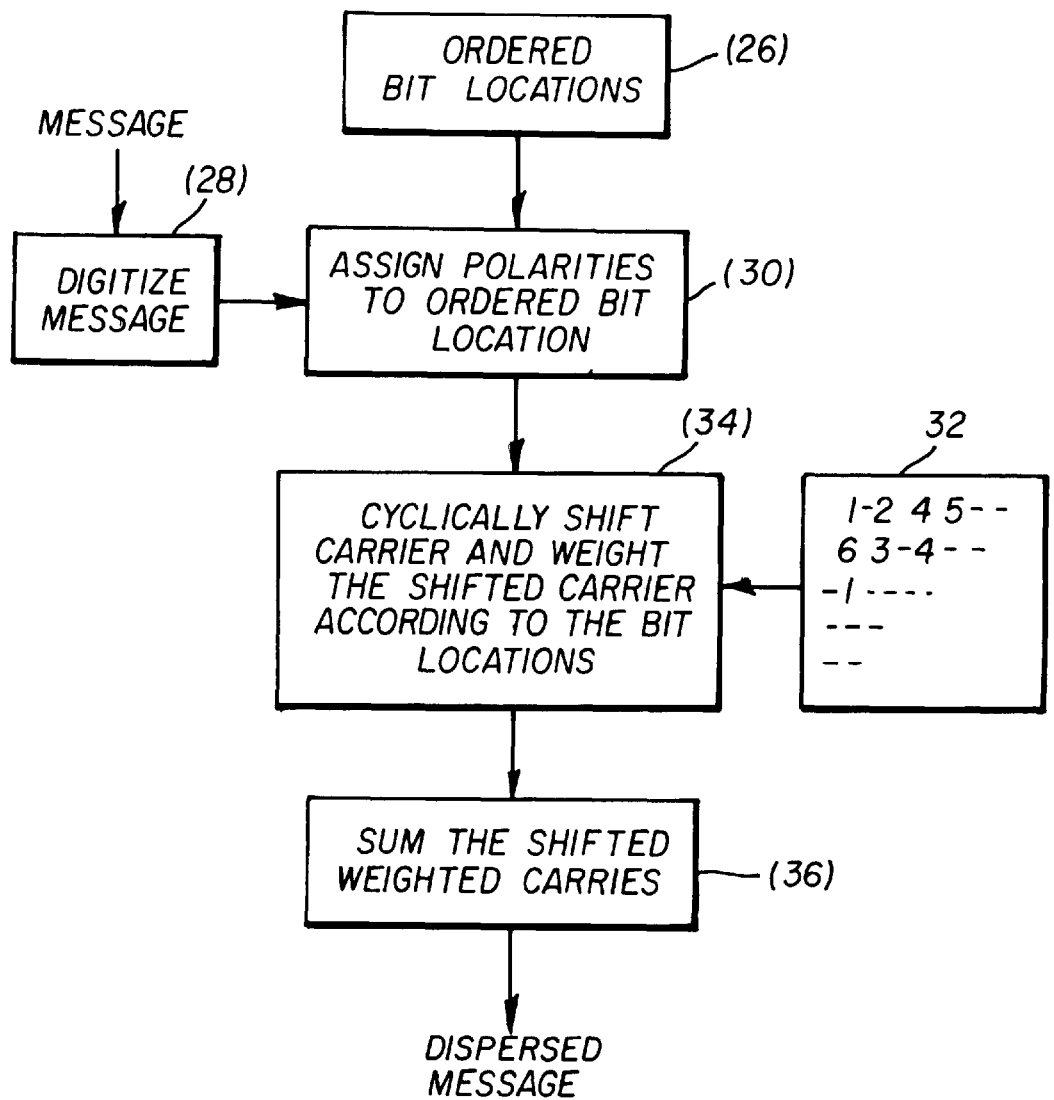
FIG. 2 is a flow chart showing the steps of the method of the present invention.

Referring to FIG. 2, the message is generated according to the present invention by defining (26) a list of ordered bit locations, an example of which is shown in Table 1

TABLE 1

32 place X,Y ordered bit location table

| BIT NUMBER | XLOC | YLOC |
|---|---|---|
| 0 | 43 | 4 |
| 1 | 4 | 7 |
| 2 | 15 | 7 |
| 3 | 28 | 9 |
| 4 | 9 | 12 |
| 5 | 55 | 12 |
| 6 | 15 | 16 |
| 7 | 37 | 17 |
| 8 | 5 | 18 |
| 9 | 44 | 21 |
| 10 | 11 | 22 |
| 11 | 35 | 24 |
| 12 | 27 | 25 |
| 13 | 55 | 28 |
| 14 | 9 | 29 |
| 15 | 31 | 31 |
| 16 | 48 | 34 |
| 17 | 9 | 37 |
| 18 | 17 | 38 |
| 19 | 2 | 40 |
| 20 | 34 | 41 |
| 21 | 12 | 44 |

TABLE 1-continued 32 place X,Y ordered bit location table

| BIT NUMBER | XLOC | YLOC |
|---|---|---|
| 22 | 41 | 46 |
| 23 | 5 | 47 |
| 24 | 34 | 48 |
| 25 | 16 | 49 |
| 26 | 44 | 53 |
| 27 | 22 | 53 |
| 28 | 29 | 56 |
| 29 | 15 | 58 |
| 30 | 7 | 60 |
| 31 | 43 | 61 |

In a preferred embodiment, the ordered bit locations are generated in such a way that the autocorrelation of the bit locations in an image is highly peaked. An example of how to generate such a list of bit locations is disclosed in U.S. patent application Ser. No. 09/453,160 filed Dec. 2, 1999 by Honsinger et al. entitled Method And Computer Program For Embedding And Extracting An Embedded Message From A Digital Image.

The message, which may have been input by the camera user, or generated by the process and control electronics is digitized (28), if required, and each bit of the digital message is assigned (30) as a polarity (+ or −) with ones being assigned a plus polarity and zeros a minus polarity, to one of the ordered bit locations. Next, a random carrier 32 is cyclically shifted (34) according to the corresponding bit location and the shifted carriers are weighted by the corresponding polarity assigned to the bit location. If the polarity is +, no change is made to the shifted carrier, however if the polarity is −, all of the values of the carrier are reversed in sign. The carrier is a random array of values, for example from +10 to −10 that is preferably generated according to the disclosure in U.S. Pat. No. 6,044,156, referenced above. The carrier preferably has a random phase and a flat Fourier spectrum. An example of a 64 pixel by 64 line carrier generated according to the method described by Honsinger et al. is shown in FIG. 3 and Table 3A–3D.

The cyclic shifting operation (34) can be simply implemented in the process and control computer by use of a look up table that defines the new locations for the shifted data from the carrier based on the bit location data. The new data values are defined as follows $$C'(x,y)=C(LUT(x+\Delta x), LUT(y+\Delta y)),$$

where C'(x,y) is the cyclically shifted carrier, x and y are the coordinate locations of the values in both the original and shifted carriers, and Δx and Δy are the bit locations from Table 1. The LUT is a 128 place table that starts with 0 and goes up to 63 and then repeats. The effect of the table is to implement the mathematical process of cyclically shifting and eliminates the need for the use of the C language runtime library Modulus function when the program is implemented in the C programming language.

Finally the weighted, cyclically shifted carriers are summed (36) to produce the dispersed message.

Assuming that the digital image is much larger than the dispersed message, the dispersed message is preferably added to the digital image in a tile wise fashion as is known in the prior art. The image containing the hidden message is then stored in the memory 22. If the digital image is compressed, for example by using JPEG compression, the hidden message is can be added to the image prior to compression to minimize the amount of redesign from current practice that is required.

The present invention may be implemented in existing cameras by addition of a computer program to the computer in the process and control electronics. Similarly, the invention can be implemented in a digital printer such as an ink jet printer or thermal resistive printer, a display device such as an Liquid Crystal Display or Organic Light Emitting Diode Display, or a scanner such as a flatbed or handheld scanner. Hidden message, such as a copyright notice, to an image can be added respectively before printing, displaying, or after scanning an image.

Appendix A contains a computer program written in the C language for generating an embedded message according to the present invention. The computer program can be distributed to camera users for example by delivering the software on a PCMCIA memory card or a CompactFlash card available from the SanDisc corporation that is plugged into the camera and accessed by the process and control electronics.

The hidden messages are recovered from the image by cross correlating the image containing the dispersed message with the carrier to produce a recovered message image that appears as a digital image having negative or positive peaks located at the same bit locations that are noted in Table 1 above. The digital message data is then reconstructed by detecting the polarity of the peaks and assigning corresponding bit values (i.e. a 1 for positive peaks and a 0 for negative peaks).

The invention has been described in detail with particular reference to certain preferred embodiments thereof, but it will be understood that variations and modifications can be effected within the spirit and scope of the invention.

PARTS LIST 10 lens
12 subject
14 image sensor
16 filter array
18 process and control electronics
20 display screen
22 memory
24 operator interface
26 generate message step
28 digitize message step
30 assign bit polarity step
32 carrier
34 cyclically shift carrier step
36 sum weighted carrier step

APPENDIX A

```
Program Source Code
#include <stdio.h>
#include <stdlib.h>
#include <sys/param.h>
#include <curses.h>
#define BOOL unsigned char
#define UCHAR unsigned char
#define ULONG unsigned long
#define USHORT unsigned short
#define CLIP(X) (((X) < 0) ? 0:(((X) > 255) ? 255:(X)))
#define SIZE 128
#define NUM_BITS 64
#define II 0x4949
#define MM 0x4D4D
#define BIG_ENDIAN 0x01020304
#define LITTLE_ENDIAN 0x04030201
#define IMAGE_WIDTH_TAG 256
```

APPENDIX A-continued

```
#define IMAGE_LENGTH_TAG 257
#define STRIP_OFFSETS_TAG 273
#define SAMPLES_PER_PIXEL_TAG 277
#define STRIP_BYTE_COUNTS_TAG 279
typedef struct
{
USHORT byteOrder;
USHORT version;
ULONG firstIFDoffset;
} TIFF_HEADER;
typedef struct
{
USHORT tag;
USHORT type;
ULONG count;
ULONG value;
} IFD_ENTRY;
void process (UCHAR *data, int msgCarrier[SIZE][SIZE], ULONG
  numBytes, ULONG width, ULONG height, ULONG samples);
ULONG getEndianess(void);
ULONG swapULong(ULONG value);
USHORT swapUShort(USHORT value);
void getIFD(IFD_ENTRY *ifdCopy, IFD_ENTRY *ifd, BOOL
  swapBytes);
ULONG getULong(ULONG *value, BOOL swapBytes);
USHORT getUShort(USHORT *value, BOOL swapBytes);
unsigned char coords[NUM_BITS][2] = {
/* Bit xloc yloc */
/* --- ---- ---- */
/*  0  */ 42, 7,
/*  1  */ 86, 7,
/*  2  */ 115, 8,
/*  3  */ 8, 13,
/*  4  */ 99, 13,
/*  5  */ 29, 14,
/*  6  */ 70, 17,
/*  7  */ 55, 18,
/*  8  */ 84, 22,
/*  9  */ 18, 23,
/* 10  */ 41, 23,
/* 11  */ 110, 23,
/* 12  */ 96, 30,
/* 13  */ 30, 32,
/* 14  */ 60, 32,
/* 15  */ 74, 33,
/* 16  */ 118, 35,
/* 17  */ 10, 36,
/* 18  */ 46, 37,
/* 19  */ 87, 41,
/* 20  */ 105, 41,
/* 21  */ 22, 44,
/* 22  */ 36, 47,
/* 23  */ 69, 47,
/* 24  */ 4, 49,
/* 25  */ 53, 49,
/* 26  */ 94, 53,
/* 27  */ 110, 55,
/* 28  */ 81, 57,
/* 29  */ 17, 58,
/* 30  */ 32, 61,
/* 31  */ 61, 62,
/* 32  */ 46, 63,
/* 33  */ 96, 67,
/* 34  */ 111, 70,
/* 35  */ 18, 73,
/* 36  */ 80, 73,
/* 37  */ 34, 75,
/* 38  */ 52, 78,
/* 39  */ 4, 79,
/* 40  */ 92, 81,
/* 41  */ 67, 82,
/* 42  */ 106, 84,
/* 43  */ 23, 87,
/* 44  */ 41, 87,
/* 45  */ 82, 91,
/* 46  */ 118, 92,
/* 47  */ 10, 93,
/* 48  */ 54, 95,
/* 49  */ 68, 96,
/* 50  */ 98, 96,
/* 51  */ 32, 98,
/* 52  */ 18, 105,
/* 53  */ 87, 105,
/* 54  */ 110, 105,
/* 55  */ 44, 106,
/* 56  */ 73, 110,
/* 57  */ 58, 111,
/* 58  */ 99, 114,
/* 59  */ 29, 115,
/* 60  */ 120, 115,
/* 61  */ 13, 120,
/* 62  */ 42, 121,
/* 63  */ 86, 121};
main(int argc, char *argv[ ])
{
int carrier[SIZE][SIZE];
int msgCarrier[SIZE][SIZE];
unsigned char tmp, tmp2;
int x,y;
int ix,iy;
int max;
char msg[80];
char inputFilePath[MAXPATHLEN];
char outputFilePath[MAXPATHLEN];
FILE *inFile, *outFile;
UCHAR *file;
USHORT version;
USHORT numEntries;
ULONG fileLength;
ULONG ifdPtr;
ULONG i,j;
ULONG stripOffset;
ULONG stripByteCount;
ULONG endianess;
ULONG imageWidth;
ULONG imageLength;
ULONG samplesPerPixel;
TIFF_HEADER *header;
IFD_ENTRY *ifd;
IFD_ENTRY ifdCopy;
float scaleFactor;
BOOL swapBytes;
if (argc == 1)
{
    strcpy(msg, "DC290WMC");
}
else
{
    strcpy(msg, argv[1]);
}
if ((inFile = fopen("carrier.dat", "rb")) == NULL)
{
    perror("fopen");
    return(-1);
}
if (fread(carrier, SIZE*SIZE*sizeof(int), 1, inFile) != 1)
{
    perror("fread");
    return(-1);
}
if (fclose(inFile) != 0)
{
    perror("fclose");
    return(-1);
}
for (y=0; y<SIZE; y++)
{
    for (x=0; x<SIZE; x++)
    {
    carrier[y][x] = (int)swapULong((ULONG)carrier[y][x]);
    }
}
```

APPENDIX A-continued

```
for (y=0; y<SIZE; y++)
{
    for (x=0; x<SIZE; x++)
    {
msgCarrier[y][x] = 0;
    }
}
printf("Message to embed is %s\n\n", msg);
printf("Bit Xloc Yloc Val\n");
printf("--- ---- ---- ---\n");
for (i=0; i<NUM_BITS; i++)
{
    tmp = msg[i/8];
    /* tmp2 cal below works ok, but you end up with numbers > 1
    tmp2 = tmp & (1 << (i % 8)); */
    tmp2 = (tmp & (1 << (i % 8))) >> (i % 8);
    printf(" %2d %3d %3d %d\n", i, coords[i][0], coords[i][1], tmp2);
    if (tmp2)
    {
for (iy=0, y=coords[i][1]; iy<SIZE; iy++, y++)
{
    for (ix=0, x=coords[i][0]; ix<SIZE; ix++, x++)
    {
msgCarrier[iy][ix] += carrier[y % SIZE][x % SIZE];
    }
}
    }
    else
    {
for (iy=0, y=coords[i][1]; iy<SIZE; iy++, y++)
{
    for (ix=0, x=coords[i][0]; ix<SIZE; ix++, x++)
    {
msgCarrier[iy][ix] -= carrier[y % SIZE][x % SIZE];
    }
}
    }
}
max = 0;
for (y=0; y<SIZE; y++)
{
    for (x=0; x<SIZE; x++)
    {
if (abs(msgCarrier[y][x]) > max)
{
    max = abs(msgCarrier[y][x]);
}
    }
}
printf("\nAbsolute Maximum value is %d\n", max);
/* Scale the message carrier to 16 max. */
scaleFactor = 16.0 / (float)max;
for (y=0; y<SIZE; y++)
{
    for (x=0; x<SIZE; x++)
    {
msgCarrier[y][x] = nint((float)msgCarrier[y][x] * scaleFactor);
    }
}
strcpy(inputFilePath, "barney.tif");
strcpy(outputFilePath, "barney1.tif");
if ((inFile = fopen(inputFilePath, "r")) == NULL)
{
    perror("Unable to open input file");
    return(-1);
}
if(fseek(inFile, 0L, SEEK_END) < 0)
{
    perror("Unable to seek to end of input file");
    return(-1);
}
fileLength = ftell(inFile);
if (fseek(inFile, 0L, SEEK_SET) < 0)
{
    perror("Unable to seek to start of input file");
    return(-1);
}
```

APPENDIX A-continued

```
printf("%s is %u bytes in length.\n", inputFilePath, fileLength);
if((file = malloc(fileLength)) == NULL)
{
    perror("Unable allocate memory for the input file");
    return(-1);
}
if (fread(file, fileLength, 1, inFile) == 0)
{
    perror("Unable to read input file");
    return(-1);
}
printf("%s file read in\n", inputFilePath);
header = (TIFF_HEADER*)&file[0];
if (header->byteOrder != MM && header->byteOrder != II)
{
    printf("This is not a valid TIFF Image File.\n");
    return(-1);
}
endianess = getEndianess( );
if (header->byteOrder == MM && endianess == LITTLE_ENDIAN ||
    header->byteOrder == II && endianess == BIG_ENDIAN)
{
    swapBytes = TRUE;
}
else
{
    swapBytes = FALSE;
}
version = getUShort(&header->version, swapBytes);
if (version < 42)
{
    printf("This is not a valid TIFF Image File (Version < 42).\n");
    return(-1);
}
ifdPtr = getuLong(&header->firstIFDoffset, swapBytes);
ifd = &ifdCopy;
printf("\n");
while(ifdPtr)
{
    numEntries = getUShort((USHORT*)&file[ifdptr], swapBytes);
    printf("IFD at 0x%08x has %u entries:\n", ifdPtr, numEntries);
    stripOffset = 0;
    stripByteCount = 0;
    for (i=0; i<numEntries; i++)
    {
getIFD(&ifdCopy,(IFD_ENTRY*)&file[ifdPtr+2+i*sizeof(IFD_EN-
TRY)], swapBytes);
printf("%2u) Tag:%5u, Type:%2u, Count:%4u, Value:%10u%08x\n",
    i+1, ifd->tag, ifd->type, ifd->count, ifd->value,
    ifd->value);
if (ifd->tag == STRIP_OFFSETS_TAG)
{
    if (ifd->count > 1)
    {
printf("Only one strip offset is supported.\n");
return(-1);
    }
    stripOffset = ifd->value;
}
if (ifd->tag == STRIP_BYTE_COUNTS_TAG)
{
    if (ifd->count > 1)
    {
printf("Only one strip byte count is supported.\n");
return(-1);
    }
    stripByteCount = ifd->value;
}
if (ifd->tag == IMAGE_WIDTH_TAG)
{
    imageWidth = ifd->value;
}
if (ifd->tag == IMAGE_LENGTH_TAG)
{
    imageLength = ifd->value;
}
```

APPENDIX A-continued

```
if (ifd->tag == SAMPLES_PER_PIXEL_TAG)
{
    samplesPerPixel = ifd->value;
}
        }
        if (stripOffset != 0 && stripByteCount != 0)
        {
printf("\nEncoding strip at 0x%08x of %u bytes\n",
  stripOffset, stripByteCount);
process(&file[stripOffset], msgCarrier, stripByteCount,
  imageWidth, imageLength, samplesPerPixel);
        }
        ifdPtr = getULong((ULONG*)&file[ifdPrt+2+i*sizeof(IF_ENTRY)],
            swapBytes);
        print("\n");
}
if ((outFile = fopen(outputFilePath, "w")) == NULL)
{
    perror("Unable to open output file");
    return(-1);
}
if (fwrite(file, fileLength, 1, outFile) == 0)
{
    perror("Unable to write output file");
    return(-1);
}
free(file);
fclose(outFile);
print("%s file written out\n", outputFilePath);
fclose(inFile);
return(0);
}
void process (UCHAR *data, int msgCarrier[SIZE][SIZE], ULONG
  numBytes, ULONG width, ULONG height, ULONG sample)
{
ULONG, x,y;
int tmp;
if (samples == 3)
{
    for (y=0; y<height; y++)
    {
    for (x=0; x<width; x++)
    {
        data[(y*width+x)*3] = CLIP(
    data[(y*width+x)*3] + msgCarrier[y % SIZE][x % SIZE]);
        data[(y*width+x)*3+1] = CLIP(
    data[(y*width+x)*3+1] + msgCarrier[y % SIZE][x % SIZE]);
        data[(y*width+x)*3+2] = CLIP(
    data[(y*width+x)*3+2] + msgCarrier[y % SIZE][x % SIZE]);
    }
    }
}
else if (samples == 1)
{
    for (y=0; y<height; y++)
    {
    for (x=0; x<width; x++)
    {
        data[y*width+x] = CLIP(
    data[y*width+x] + msgCarrier[y % SIZE][x % SIZE]);
    }
    }
}
}
ULONG getEndianess(void)
{
UCHAR buf[4];
int i;
ULONG value;
for (i=0; i<4; i++)
{
    buf[i] = i+1;
}
value = *((ULONG*)buf);
return(value);
}

ULONG swapULong(ULONG value)
{
UCHAR *ptr;
UCHAR tmp;
ptr = (UCHAR*)&value;
tmp = ptr[0];
ptr[0] = ptr[3];
ptr[3] = tmp;
tmp = ptr[1];
ptr[1] = ptr[2];
ptr[2] = tmp;
return (value);
}
USHORT swapUShort(USHORT value)
{
UCHAR *ptr;
UCHAR tmp;
ptr = (UCHAR*)&value;
tmp = ptr[0];
ptr[0] = ptr[1];
ptr[1] = tmp;
return (value);
}
void getIFD(IFD_ENTRY *ifdCopy, IFD_ENTRY *ifd, BOOL
  swapBytes)
{
/* Copy the IFD to another buffer to take care of
   the 4 byte boundary problems. */
memcpy(ifdCopy, ifd, sizeof(IFD_ENTRY));
if (swapBytes)
{
    ifdCopy->tag = swapUShort(ifdCopy->tag);
    ifdCopy->type = swapUShort(ifdCopy->type);
    ifdCopy->count = swapULong(ifdCopy->count);
    if (ifdCopy->type == 3 && ifdCopy->count == 1) /* 1 Short */
    {
    ifdCopy->value = swapUShort((USHORT)(ifdCopy->value >> 16));
    }
    else
    {
    ifdCopy->value = swapULong(ifdCopy->value);
    }
}
else if (ifdCopy->type == 3 && ifdCopy->count == 1)
{
    ifdCopy->value = ifdCopy->value >> 16;
}
}
ULONG getULong(ULONG *value, BOOL swapBytes)
{
ULONG tmp;
/* Copy the value to another buffer to take care of
   the 4 byte boundary problems. */
memcpy(&tmp, value, sizeof(ULONG));
if (swapBytes)
{
    tmp = swapULong(tmp);
}
return(tmp);
}
USHORT getUShort(USHORT *value, BOOL swapBytes)
{
USHORT tmp;
/* Copy the value to another buffer to take care of
   the 2 byte boundary problems. */
memcpy(&tmp, value, sizeof(USHORT));
if (swapBytes)
{
    tmp = swapUShort(tmp);
}
return(tmp);
}
```

TABLE 3A

| | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|
| Upper Left = | | | | | | | | | | | | | | | | | | | | | | | | | | | | | | | |
| 1 | 66 | −7 | 0 | 37 | 23 | −41 | −7 | 23 | 29 | 20 | −29 | 39 | −29 | 19 | −22 | 2 | 6 | −31 | 5 | 39 | −61 | −4 | −52 | 7 | 19 | 23 | −27 | 19 | 9 | −26 | 7 |
| −19 | 18 | −33 | 18 | −9 | 31 | 40 | 5 | −14 | −13 | −17 | 12 | 25 | −33 | 9 | −29 | 32 | −37 | 56 | 18 | −6 | 4 | 24 | 9 | −27 | 5 | 9 | −9 | 1 | −4 | 5 | 0 |
| 2 | 43 | −72 | 4 | −4 | 18 | −53 | 6 | −15 | 19 | −19 | −1 | −3 | −5 | −36 | 15 | −5 | −21 | 15 | −50 | 48 | −3 | −13 | 29 | −25 | −11 | −19 | 44 | −12 | −7 | 15 | 45 |
| 22 | 18 | 12 | 4 | 2 | 13 | 60 | −5 | −50 | 27 | 44 | 23 | −34 | 0 | 26 | 10 | 12 | 41 | −24 | −8 | 17 | −41 | 11 | −10 | 30 | 37 | 31 | −56 | 52 | −2 | −59 | 46 |
| 5 | −3 | −62 | 16 | 5 | −10 | 30 | −23 | −22 | 14 | 5 | 0 | 0 | 28 | 21 | 43 | −39 | −36 | 16 | −3 | −11 | 15 | −3 | 22 | −33 | 4 | 15 | −68 | 15 | −7 | 5 | −38 |
| −2 | −18 | 21 | 41 | 28 | −74 | −27 | 41 | 41 | −23 | −5 | −7 | −23 | −20 | −27 | −16 | 16 | 9 | 41 | 43 | 2 | 9 | −31 | 28 | 20 | −41 | 40 | −19 | 38 | −2 | 7 | 35 |
| 53 | 24 | −39 | −7 | −8 | −35 | −6 | 9 | 6 | −12 | 1 | 6 | −43 | 12 | 31 | −36 | 27 | −46 | −14 | −55 | −22 | 5 | −32 | −44 | −47 | 11 | 6 | 64 | −20 | −43 | −3 | 22 |
| 6 | 15 | −14 | 1 | 4 | 34 | 27 | 26 | −18 | −40 | −8 | 18 | 17 | −8 | 19 | −4 | 3 | −10 | 29 | −74 | 54 | 47 | −5 | 21 | 23 | −29 | 17 | −49 | −45 | 25 | 7 | −38 |
| −48 | −23 | 4 | −77 | −9 | −3 | −74 | 6 | −33 | −12 | 31 | 37 | 7 | −17 | −20 | 33 | −47 | −17 | 41 | 16 | −28 | −7 | −10 | 16 | 24 | 26 | −16 | 4 | 42 | 24 | −29 | −17 |
| 6 | −4 | 33 | 19 | −15 | 14 | 10 | 36 | 10 | 4 | 18 | 54 | −37 | −50 | 36 | −2 | 24 | 42 | −56 | −20 | −39 | 32 | 28 | −65 | 17 | 1 | −21 | −46 | 1 | 23 | 22 | −4 |
| −17 | 17 | −34 | −42 | 5 | 0 | 0 | −2 | 22 | 11 | −42 | −17 | −57 | 16 | 12 | −11 | −6 | 22 | −14 | 1 | −28 | 4 | 16 | 23 | −23 | 40 | −9 | −24 | −24 | −14 | −11 | 49 |
| 25 | −2 | −11 | 26 | −4 | 41 | −57 | −6 | −12 | 13 | −39 | 39 | 78 | 2 | −67 | 42 | −32 | −5 | 20 | −6 | 11 | 4 | −19 | −3 | −23 | −38 | 16 | 25 | −6 | 12 | −51 | −5 |
| 35 | −21 | 58 | 25 | 4 | −7 | 30 | −46 | 0 | 17 | −49 | −8 | 27 | −18 | −1 | 10 | −29 | 37 | 29 | −5 | −31 | 63 | −11 | −15 | 44 | −7 | 26 | 73 | 10 | −5 | −8 | 32 |
| 9 | −35 | −42 | 14 | −20 | 35 | 21 | −15 | −7 | 36 | −3 | −38 | −36 | 42 | −17 | −8 | −24 | 69 | −44 | 4 | −16 | −3 | −1 | −28 | −16 | 27 | 12 | −4 | −22 | 0 | 6 | 36 |
| −45 | −6 | 7 | 9 | 4 | −30 | 2 | 12 | −11 | 7 | 26 | 23 | −6 | 5 | −51 | 27 | 25 | 48 | 15 | −1 | 18 | −9 | −7 | 33 | 17 | −23 | −31 | −44 | −7 | −58 | 22 | −13 |
| 12 | −16 | 35 | −1 | −3 | −31 | −39 | 24 | 25 | 18 | 27 | −1 | 35 | −14 | −17 | −40 | 4 | −19 | −43 | −64 | 28 | 0 | −13 | 28 | −12 | −12 | 41 | 24 | 0 | 22 | 12 | −38 |
| 0 | −1 | −9 | 8 | 21 | 36 | −53 | 36 | −48 | 16 | 2 | −20 | −3 | −3 | 42 | −22 | 63 | −38 | 42 | 50 | 50 | −36 | −5 | −18 | 9 | −1 | 0 | −20 | 6 | 20 | −15 | 35 |
| −39 | −26 | −8 | −44 | 18 | 24 | 10 | −11 | −41 | −2 | −36 | 8 | 1 | 29 | −36 | 53 | 11 | −29 | −1 | −33 | −5 | 25 | −49 | 3 | 0 | 18 | −17 | −12 | 22 | 5 | −18 | 5 |
| 63 | 19 | 59 | −13 | −58 | 3 | 1 | 18 | −8 | 36 | 5 | −23 | 29 | −66 | −3 | −34 | −13 | 1 | −12 | −38 | −30 | 29 | 75 | −46 | −2 | 6 | −20 | 28 | −15 | 39 | 10 | 0 |
| −59 | −3 | 0 | 64 | −2 | 3 | 12 | −30 | 32 | −34 | 15 | 27 | −21 | 31 | 0 | −28 | 47 | −66 | −2 | 18 | 47 | −39 | 38 | −35 | 6 | 5 | 2 | −42 | −2 | 43 | −78 | −22 |
| −14 | −36 | −14 | 1 | −41 | −14 | 15 | −8 | −35 | 21 | 22 | −34 | 73 | −21 | 29 | 3 | 57 | −5 | 27 | 53 | 21 | −17 | −44 | 26 | 9 | 0 | 20 | −38 | −11 | 40 | −9 | 46 |
| −1 | 19 | −18 | 11 | 51 | 14 | 22 | 23 | −52 | −2 | −2 | 10 | −30 | −1 | −5 | −36 | −72 | −26 | −38 | −29 | −6 | −41 | 29 | 20 | −19 | 49 | −30 | 5 | 3 | −14 | 31 | 40 |

TABLE 3A-continued

Upper Left =

| -15 | 45 | -26 | -35 | -47 | -20 | 60 | -3 | -9 | -3 | -7 | 17 | 22 | -33 | -11 | 40 | 5 | 30 | 27 | 4 | 7 | 21 | -8 | 9 | -36 | 37 | -21 | -27 | 25 | -18 | 19 | -37 |
|---|---|---|---|---|---|---|---|---|---|---|---|---|---|---|---|---|---|---|---|---|---|---|---|---|---|---|---|---|---|---|---|
| 0 | -5 | 18 | -3 | 13 | 2 | -29 | -31 | 58 | -27 | -17 | 14 | 41 | -6 | -53 | 25 | 3 | 79 | 11 | -1 | -26 | 12 | -1 | 11 | -5 | 4 | 7 | 6 | -15 | -25 | 26 | -51 |
| 56 | -37 | -5 | 0 | 35 | 34 | -18 | -26 | 4 | 20 | -5 | 16 | 24 | 23 | 0 | 19 | -10 | -17 | -25 | -7 | 9 | 7 | -19 | 4 | -1 | -11 | -42 | 57 | 27 | -1 | -8 | -31 |
| 15 | 28 | -33 | -1 | -17 | 10 | -17 | 0 | 3 | -1 | -4 | -18 | -4 | -34 | 27 | -13 | -55 | 45 | -27 | 7 | -33 | 8 | -5 | 36 | -3 | 1 | 0 | -23 | -30 | 24 | 12 | 68 |
| 13 | -14 | -46 | 32 | 7 | -2 | -21 | 10 | 33 | -16 | 1 | -29 | -12 | -32 | 17 | -12 | 15 | 13 | -32 | 1 | 2 | -11 | 34 | -12 | 21 | -21 | -17 | 17 | 3 | -49 | -33 | 1 |
| 53 | 16 | -2 | -2 | 58 | 11 | -26 | -6 | -1 | 15 | 6 | 10 | 22 | 32 | 5 | -11 | -8 | -24 | 1 | 20 | -16 | -25 | 7 | 44 | -2 | -41 | 46 | -25 | 38 | -35 | -30 | 49 |
| 0 | -37 | 28 | 12 | -14 | -29 | 26 | -7 | 5 | -14 | -23 | 33 | -31 | -9 | 31 | 10 | 6 | -9 | 14 | 53 | -29 | 37 | -42 | -28 | -28 | 23 | 19 | -20 | 69 | 0 | 23 | 63 |
| -38 | 11 | -32 | 5 | -5 | -5 | 12 | 4 | -9 | 7 | 21 | -49 | 48 | -19 | -19 | -8 | -28 | -20 | -17 | 7 | 47 | -6 | 6 | -20 | 57 | -19 | -7 | -20 | 7 | -10 | -5 | 2 |
| 21 | -6 | 14 | -27 | 7 | 34 | -27 | -31 | 33 | -25 | 13 | 37 | -51 | -16 | 64 | -36 | 28 | 36 | 10 | -26 | -15 | -23 | 0 | -16 | -15 | 43 | -29 | -36 | -27 | -8 | -2 | 17 |
| 7 | 18 | -32 | -8 | -26 | -13 | 32 | -33 | -13 | 22 | 47 | 18 | -4 | -21 | 34 | -27 | -2 | -11 | 14 | 15 | 26 | 5 | 5 | 63 | -52 | 14 | -18 | 3 | -11 | 13 | 4 | -8 |

TABLE 3B

| Upper Right = | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|
| -30 | 0 | -2 | -13 | 56 | -47 | -27 | -26 | 17 | -7 | 20 | 21 | -22 | 23 | -7 | -71 | 26 | -24 | -8 | 30 | -3 | -52 | -15 | -32 | -73 | 84 | 27 | 29 | -34 | -7 | -15 | 39 |
| 7 | 10 | -24 | 25 | -24 | 36 | 6 | 20 | 35 | -20 | -53 | -21 | 25 | 42 | 35 | -37 | -10 | -2 | 2 | -23 | 1 | 13 | 46 | 21 | -23 | -15 | 11 | 5 | -16 | 37 | -1 | 0 |
| 23 | 13 | -37 | 17 | -11 | -4 | -4 | 29 | -31 | 4 | 6 | 24 | -9 | -27 | 7 | 40 | -10 | 16 | -8 | 2 | 2 | 1 | 6 | -15 | 47 | -33 | 37 | -46 | -36 | 20 | -10 | -45 |
| -50 | 16 | -31 | 5 | -39 | 5 | -2 | -45 | 42 | 21 | 0 | -18 | -35 | 8 | -28 | 37 | 18 | -7 | 8 | -46 | -13 | 9 | -15 | -2 | 21 | 3 | -50 | 32 | 48 | -51 | 2 | 34 |
| 17 | -62 | 69 | -3 | 11 | 5 | -12 | -9 | 5 | 12 | 0 | -8 | 36 | 27 | -4 | 7 | -5 | 41 | 1 | 51 | -25 | 65 | -2 | -19 | -1 | 16 | 1 | 0 | 17 | 16 | -24 | 8 |
| 25 | 49 | -17 | 0 | 34 | 5 | -3 | 10 | 42 | -17 | 6 | -51 | -7 | 28 | -36 | -28 | -5 | 27 | -35 | -6 | 2 | -26 | -19 | 2 | 5 | -12 | 14 | 19 | -34 | 56 | -83 | -28 |
| 35 | -47 | 15 | -18 | 2 | 2 | -11 | 21 | -29 | -11 | -5 | 24 | 9 | 4 | -54 | 6 | -25 | 4 | 30 | -38 | -30 | -3 | 15 | 5 | -10 | -53 | -12 | 3 | 4 | 17 | 41 | -13 |
| -40 | -1 | -4 | 43 | -20 | 13 | -22 | -55 | 17 | -56 | 59 | -10 | 17 | 1 | -2 | 94 | -34 | 1 | -19 | 0 | 29 | -28 | 31 | -10 | 35 | 45 | -28 | 3 | 27 | -48 | -19 | -2 |
| 44 | 3 | -19 | -46 | 9 | -24 | 25 | 24 | 35 | -26 | 5 | -2 | -28 | -23 | 11 | 10 | 7 | -4 | -4 | 28 | -6 | -38 | -4 | 35 | -50 | -6 | 3 | -11 | 51 | 1 | -20 | |
| 10 | -38 | -2 | -7 | 26 | 37 | 6 | 27 | 7 | -19 | 17 | 57 | -9 | 45 | 18 | -1 | -10 | -1 | -1 | 26 | 21 | 60 | 0 | -4 | 47 | -10 | -6 | -39 | 5 | -30 | 8 | -43 |
| 15 | 15 | 50 | -8 | 3 | -3 | 2 | -46 | -27 | -32 | 4 | -30 | -6 | -62 | 14 | -1 | -31 | -22 | 16 | -33 | -9 | 36 | 13 | -30 | 31 | -27 | 36 | -16 | 3 | 41 | 18 | 10 |
| 22 | -20 | -21 | -34 | 13 | -37 | 4 | 4 | 29 | 29 | -18 | 0 | 54 | -7 | 0 | 37 | -3 | 28 | 27 | -17 | 14 | 21 | -34 | 11 | -27 | 86 | 13 | -14 | 37 | -46 | -5 | 1 |
| -29 | 23 | -12 | 41 | 31 | 36 | 19 | -27 | -37 | -6 | -39 | -6 | 10 | -16 | 8 | -35 | -2 | -23 | -10 | 46 | 12 | 42 | 34 | 2 | -26 | 13 | 9 | -3 | 0 | -18 | -3 | 4 |
| -6 | -31 | -33 | -12 | -51 | -9 | 4 | -46 | 35 | -2 | 25 | 37 | 36 | 23 | -7 | 28 | -8 | -39 | 34 | -26 | 3 | 21 | 11 | 23 | 2 | 9 | -3 | -44 | 34 | 10 | -6 | -32 |
| -26 | 26 | 25 | 28 | -6 | 34 | 7 | 4 | 13 | 36 | -24 | 3 | -24 | -40 | 12 | 14 | -6 | 5 | 23 | -18 | -37 | 27 | -72 | -51 | -4 | -3 | -14 | -14 | 5 | 18 | 0 | 15 |
| -14 | -2 | -18 | -15 | 3 | 22 | 54 | 7 | -2 | 15 | -15 | 3 | 10 | -45 | 36 | 15 | -3 | -12 | 7 | 7 | -3 | -16 | 63 | 44 | 18 | 9 | -7 | 1 | 53 | 9 | -1 | |
| -25 | 43 | -28 | -35 | 42 | -14 | 0 | -18 | 25 | 35 | -27 | 18 | 20 | -14 | 25 | -14 | 3 | -7 | -37 | -40 | 35 | -6 | -22 | -23 | 9 | -54 | -19 | -17 | 9 | -51 | -15 | |
| 0 | 26 | 22 | -55 | -14 | 26 | -27 | -78 | 0 | -42 | -27 | 3 | 12 | -47 | -1 | -42 | 28 | 14 | -21 | -12 | -12 | 0 | -2 | 12 | 36 | 41 | 0 | 2 | 15 | -6 | -7 | |
| 12 | 4 | 9 | -7 | -27 | 26 | 38 | 5 | 23 | 14 | -59 | 54 | -3 | 47 | 34 | -2 | 7 | 30 | -9 | 29 | 53 | 7 | -6 | 15 | -22 | 6 | -2 | 11 | -22 | 29 | -23 | |
| -5 | 5 | -22 | -33 | -7 | 31 | 1 | -25 | -3 | 5 | 16 | 12 | 0 | -3 | 6 | -26 | 11 | -48 | -3 | 38 | 21 | -64 | 38 | -4 | -28 | 33 | -50 | -26 | -6 | 12 | | |
| -17 | 11 | 27 | 30 | 3 | 23 | -27 | 57 | -5 | -4 | -53 | 3 | 26 | -47 | 31 | 65 | 10 | 22 | -10 | -22 | 10 | 18 | -20 | -5 | -11 | -18 | 8 | -37 | -15 | 36 | 12 | |
| -4 | -48 | -7 | -9 | -15 | -10 | 23 | -19 | 18 | 46 | 18 | 0 | 7 | -21 | -38 | -32 | 25 | -23 | 26 | -8 | -13 | -13 | -3 | 3 | 39 | 48 | 32 | 6 | 32 | -50 | 11 | |
| 31 | -10 | -27 | 43 | -3 | 2 | -10 | -35 | -22 | 21 | 7 | -29 | -20 | -38 | -9 | -14 | 29 | 56 | 6 | -35 | 46 | -77 | -23 | 59 | -13 | -32 | 28 | -34 | -17 | 76 | 16 | |
| 12 | 12 | 5 | 5 | 3 | 20 | 2 | -35 | -9 | 18 | -46 | 0 | 40 | 27 | 35 | 1 | 14 | 14 | 6 | 14 | 4 | -11 | 19 | -9 | 0 | -25 | -16 | -29 | -39 | 76 | -4 | 16 |
| 6 | -18 | 29 | -23 | -54 | 48 | 7 | -34 | 37 | 59 | 15 | 0 | 24 | 1 | 30 | 8 | -27 | 37 | -30 | 6 | 19 | 45 | 1 | -29 | 38 | -6 | 3 | -16 | | | | |

TABLE 3B-continued

Upper Right =

| | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|
| 10 | -28 | 41 | 0 | 50 | -22 | 11 | 34 | -3 | -41 | -47 | -60 | 9 | -52 | 24 | 18 | -24 | -14 | 12 | -12 | 0 | -23 | -19 | -28 | 26 | -37 | 23 | -4 | 1 | -5 | 37 | -11 | |
| -14 | -25 | 13 | -24 | -6 | 41 | -26 | -22 | 10 | 26 | 27 | -13 | -11 | 34 | 11 | -4 | -37 | 7 | -8 | 45 | -16 | 43 | 4 | 53 | -1 | 7 | 22 | 9 | 11 | -6 | 22 | -23 | |
| 28 | -28 | -50 | -9 | 15 | 26 | -17 | 18 | -1 | 36 | 34 | -18 | -23 | 19 | -29 | 27 | -36 | 29 | 4 | -9 | -24 | 32 | -32 | -28 | 71 | -10 | -44 | -95 | -27 | 5 | 20 | 2 | |
| -7 | 0 | -37 | 60 | 2 | -24 | -6 | -18 | -15 | -49 | -33 | -27 | -18 | 8 | 5 | 0 | -32 | 54 | -1 | -19 | -7 | 22 | -20 | 27 | -45 | -10 | 22 | 57 | 26 | -2 | 14 | -21 | |
| -57 | 15 | 44 | -46 | -22 | 24 | -24 | 32 | 18 | 37 | 30 | 56 | 26 | 18 | -31 | 19 | -23 | 6 | 14 | -21 | -20 | -38 | 54 | 11 | -34 | -18 | 4 | 30 | -8 | -1 | 44 | 23 | |
| 8 | -15 | 47 | -13 | -2 | 4 | 37 | 4 | -21 | -33 | -30 | -5 | -23 | 42 | -56 | -1 | 6 | -12 | -25 | 0 | 20 | 12 | -45 | 3 | -43 | 19 | 33 | -60 | 16 | 23 | -26 | 11 | |
| -3 | -21 | -15 | 22 | -2 | 6 | -10 | -33 | 21 | -5 | 6 | -13 | -23 | 4 | 9 | 35 | -3 | -10 | -6 | 42 | 28 | 22 | -1 | 0 | 23 | 39 | 5 | -9 | 18 | -74 | -22 | 9 | -3 |

TABLE 3C

| Lower Left = | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|
| −21 | −25 | 20 | 42 | 30 | −4 | 5 | −43 | 6 | −27 | 16 | −7 | −24 | −7 | −6 | −13 | 41 | −11 | −6 | 21 | −22 | −42 | 14 | 5 | 20 | 41 | −1 | 4 | 23 | 20 | −21 −43 |
| 4 | 88 | −10 | −57 | 1 | −8 | 0 | −6 | 33 | −14 | −11 | −23 | 22 | −24 | −11 | 32 | −48 | −52 | 26 | −3 | 0 | −13 | −2 | −27 | −41 | 12 | −13 | −5 | 39 | 30 | 4 −28 |
| −68 | 4 | −3 | 5 | 6 | 46 | 30 | 5 | 8 | −32 | 11 | −7 | 38 | 65 | −23 | −26 | 22 | 56 | −8 | 56 | −19 | −12 | 14 | 7 | 24 | −40 | −43 | 61 | 6 | 6 | 9 −7 |
| 20 | −46 | −8 | −26 | 10 | −38 | −11 | 3 | 56 | −53 | 21 | −17 | −27 | 18 | −28 | 32 | 20 | −7 | −43 | −32 | 7 | −4 | 29 | −45 | −7 | −3 | −43 | 34 | −30 | −56 | 5 15 |
| −22 | −28 | 19 | 26 | −8 | −20 | −9 | 31 | 30 | −14 | 15 | 27 | −10 | −40 | −8 | −43 | −41 | 54 | −52 | 26 | 33 | 12 | 4 | 4 | 26 | 28 | −43 | 7 | −14 | −9 | 15 33 |
| −8 | 22 | 11 | 30 | 9 | 1 | 1 | −13 | −4 | −29 | −10 | 20 | 46 | 19 | −22 | 51 | 8 | −12 | −1 | −7 | −14 | −8 | −17 | 31 | 9 | −8 | −2 | 7 | −4 | 48 | 6 −51 |
| −11 | 16 | −37 | 20 | −45 | 5 | −15 | 0 | 28 | 13 | −11 | −52 | 22 | 14 | −1 | 40 | −20 | 17 | −23 | 51 | −14 | −16 | 39 | 35 | −26 | −48 | 37 | 6 | −4 | −40 | 6 2 |
| 5 | −7 | 9 | −44 | 34 | 69 | −5 | −99 | 23 | −11 | −27 | −6 | −18 | 0 | 25 | −20 | 44 | −33 | 75 | −11 | −26 | −28 | −6 | −5 | −27 | −41 | 35 | 1 | 28 | −10 | −24 8 |
| 3 | 38 | −7 | −23 | 21 | 5 | −33 | −21 | 15 | 20 | 33 | −2 | 42 | −22 | −33 | 6 | −1 | −33 | −20 | −23 | 22 | 46 | −40 | 66 | −39 | −2 | −14 | −12 | 10 | 0 | 24 −18 |
| −25 | 1 | 13 | −3 | −31 | 0 | −7 | 58 | −9 | 27 | 0 | 3 | 9 | −24 | 21 | −5 | −1 | −23 | 1 | 4 | 7 | −41 | −18 | 11 | −33 | −14 | −14 | 23 | −16 | 16 | −11 30 |
| 24 | 30 | 21 | −57 | −23 | 7 | −17 | 52 | 34 | −7 | −52 | 58 | 4 | −31 | −5 | 7 | 23 | −16 | 26 | −3 | 53 | −16 | 54 | 40 | −4 | 16 | −33 | 28 | −23 | 53 | 7 −21 |
| −32 | −6 | 3 | 11 | 44 | 7 | −36 | 5 | −77 | −11 | −21 | −23 | −12 | −7 | 12 | −15 | −5 | −1 | −21 | −22 | −54 | −19 | 18 | 8 | −16 | 22 | 12 | 37 | −65 | 33 | −9 26 |
| 28 | −2 | 19 | −45 | 27 | 31 | −40 | 10 | −7 | 67 | −57 | 40 | 50 | −7 | −23 | 40 | 6 | −9 | −3 | −20 | −15 | −4 | −4 | −24 | −15 | 35 | −40 | 12 | −37 | −31 | −41 4 |
| 9 | −17 | −16 | −60 | 29 | −20 | 30 | 34 | 7 | 15 | −6 | 58 | 11 | 15 | 19 | 25 | −16 | 24 | −21 | 47 | 4 | 53 | −27 | −43 | −47 | 66 | 7 | −6 | −27 | 1 | 43 −28 |
| −4 | 42 | 0 | −17 | 30 | −24 | −4 | 22 | −34 | −17 | 52 | −23 | −55 | −28 | 15 | −21 | −44 | −21 | −10 | −53 | 41 | 14 | 67 | −10 | −31 | 1 | −38 | 0 | 38 | 44 | −8 2 |
| −38 | −21 | 25 | 15 | 24 | −4 | −45 | −22 | −17 | −30 | 1 | 22 | 7 | −14 | −41 | 10 | 36 | 41 | 42 | 1 | −43 | −17 | 24 | 27 | 47 | 30 | 21 | 34 | −90 | 24 | 11 −10 |
| −36 | −36 | 45 | 27 | −10 | −45 | 4 | 15 | −18 | 21 | 20 | 24 | −1 | 1 | 22 | −5 | 1 | −30 | −15 | −13 | −13 | 14 | −5 | −61 | −48 | −46 | 8 | −77 | 4 | 17 | 2 −5 |
| 35 | −3 | −49 | −30 | −31 | 25 | −19 | 42 | 17 | −38 | 5 | 36 | −14 | 9 | −36 | −13 | 2 | 28 | 4 | −1 | 13 | 14 | 10 | 2 | 2 | 14 | −29 | −1 | 27 | 17 | −21 −20 |
| −3 | −21 | 39 | 13 | −1 | −31 | 12 | 9 | −11 | 31 | 5 | 44 | −1 | 53 | −4 | 2 | −5 | 11 | 22 | 21 | 10 | −16 | 25 | 33 | 14 | −7 | 19 | 11 | 9 | 4 | −16 2 |
| 3 | −33 | −2 | 45 | −6 | −19 | 5 | −2 | 4 | −1 | 20 | 40 | 36 | −19 | 2 | 4 | 4 | −17 | 0 | 3 | −45 | −3 | −16 | 0 | 2 | −7 | −42 | −33 | −33 | 10 | −8 5 |
| −17 | −20 | 57 | −19 | 0 | −30 | 6 | 0 | 25 | −46 | 5 | −5 | −17 | −19 | 9 | −1 | −1 | −1 | 0 | 29 | −16 | −17 | 4 | −34 | 7 | 36 | 34 | 12 | −22 | −6 | −5 −13 |
| −28 | −27 | −8 | 24 | −28 | 5 | 8 | 4 | 22 | 9 | 40 | 24 | −52 | 19 | 35 | −34 | 2 | 9 | −14 | 16 | 31 | 39 | 44 | −11 | 28 | −28 | −47 | 31 | 11 | 0 | 34 −45 |
| 42 | 5 | −34 | −32 | 0 | −28 | −5 | 22 | 24 | −3 | −3 | −10 | −1 | −20 | 7 | −53 | −5 | 7 | 29 | −61 | 19 | −14 | 11 | −15 | −5 | −22 | −15 | 26 | −3 | 16 | −25 −20 |
| 47 | 21 | 4 | −49 | 32 | 9 | −41 | 17 | 58 | −33 | 0 | −22 | −27 | 26 | −16 | 8 | 4 | −27 | 8 | −2 | −29 | 24 | −16 | −41 | 8 | −12 | 10 | 33 | −33 | 21 | −37 −11 |
| −3 | 24 | 9 | −27 | −10 | 2 | 25 | −18 | −71 | 31 | 22 | −16 | 25 | 13 | −65 | 19 | −34 | 15 | −22 | −16 | −22 | 4 | 14 | 38 | −16 | 14 | −14 | 1 | 15 | 19 | −11 19 |

TABLE 3C-continued

Lower Left =

| | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|
| −5 | 12 | −41 | 11 | −1 | 24 | −31 | 10 | 1 | −18 | −16 | −5 | 10 | 16 | −17 | −27 | 2 | −29 | 12 | −12 | 52 | −10 | 0 | −3 | −4 | 35 | −69 | 26 | 8 | −41 | 13 | 29 |
| 3 | −28 | −16 | 21 | 33 | 20 | 14 | −53 | 42 | −4 | −17 | 76 | −29 | 0 | −9 | −3 | 44 | 14 | −17 | −9 | −13 | −42 | 16 | −5 | 43 | −46 | 2 | 11 | −37 | 40 | −38 | −8 |
| 4 | −6 | 14 | 22 | −35 | 14 | −8 | 10 | 36 | 16 | −12 | −51 | −14 | 15 | −9 | −69 | 26 | −2 | 4 | −51 | 0 | 21 | 21 | −2 | 26 | 14 | −27 | −8 | 11 | 11 | −51 | −24 |
| 14 | 12 | −16 | −49 | −39 | −16 | 32 | 16 | −17 | −5 | 8 | −34 | 30 | 50 | −7 | −41 | 11 | 21 | 27 | 64 | −25 | 0 | −9 | −46 | −38 | 8 | −3 | 39 | 14 | 1 | 16 | 27 |
| −4 | −29 | 28 | 12 | 73 | −21 | −21 | −17 | −1 | 25 | 7 | 28 | −31 | 23 | −38 | 30 | −7 | −32 | −27 | −19 | 24 | 19 | 22 | −1 | 49 | 5 | −23 | 2 | 10 | 13 | −15 | −22 |
| −8 | −3 | −34 | 8 | 14 | 20 | −4 | −7 | −6 | 17 | −21 | −60 | −33 | 64 | −18 | 12 | −11 | 34 | −39 | −14 | −12 | −14 | 7 | 29 | −30 | −12 | 8 | 30 | −37 | −33 | 40 | −40 |
| −13 | 42 | 9 | 27 | −17 | −5 | −43 | 0 | 27 | −4 | 39 | −42 | 65 | −1 | −9 | 14 | 35 | 19 | 7 | −18 | 6 | 26 | −45 | 6 | −16 | −5 | 3 | 8 | 17 | 50 | −5 | 17 |
| | | | | | | | | | | | | | | | | | | | | | | | | | | | | | | 33 | |

TABLE 3D

| Lower Right = | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|
| -3 | 10 | 21 | -8 | -11 | 2 | -7 | -32 | -1 | 24 | 6 | 16 | 11 | 35 | -27 | 28 | -14 | -33 | 22 | 28 | -1 | -14 | -11 | 16 | -29 | 18 | -18 | -11 | 4 | -19 | 35 | -6 |
| 5 | 17 | -12 | -21 | 37 | 23 | 56 | -21 | -22 | -3 | -5 | 14 | -17 | 4 | -24 | -37 | 48 | -10 | -14 | -41 | -15 | -32 | -3 | 34 | 13 | 12 | -57 | 16 | 36 | 41 | -42 | -10 |
| -36 | 49 | 37 | -12 | -54 | 27 | 24 | -10 | -9 | -29 | 16 | 2 | 20 | -12 | 4 | 41 | 27 | 28 | -64 | 44 | 6 | 21 | 24 | -1 | -6 | 1 | 5 | 13 | 8 | 2 | 58 | -7 |
| 21 | -19 | 16 | -24 | -19 | -29 | -7 | 6 | -15 | 36 | 3 | -3 | -5 | -30 | 19 | -24 | -2 | 6 | -4 | 48 | 99 | 35 | -10 | -11 | -23 | -14 | 5 | -19 | 3 | -15 | 5 | 10 |
| 17 | -33 | 4 | -34 | 20 | -6 | 44 | -19 | 4 | 22 | -38 | 4 | -12 | 13 | -8 | 46 | -22 | -23 | 40 | 15 | -20 | 29 | -28 | 15 | -35 | 61 | -19 | -16 | 35 | -15 | -7 | 37 |
| -14 | 20 | 31 | -48 | 44 | 37 | -41 | 20 | 0 | 12 | 25 | -27 | -16 | 4 | 3 | -27 | -2 | -7 | -48 | -23 | 11 | -1 | 42 | -8 | -27 | 6 | -16 | -3 | 0 | -10 | -86 | -12 / 37 |
| 10 | -4 | 18 | 23 | 46 | -45 | 5 | -7 | 22 | -8 | -4 | -10 | 17 | 33 | 7 | -12 | 11 | 23 | 9 | -1 | 14 | -36 | -32 | 38 | 44 | 21 | -3 | -34 | 20 | 42 | -20 | -38 / 0 |
| -27 | -3 | -12 | 0 | -24 | 5 | 3 | -39 | -31 | -15 | 23 | -16 | 0 | 22 | -14 | -7 | -14 | -61 | -1 | 29 | -12 | 18 | -11 | 13 | -32 | -2 | -34 | 1 | 12 | 45 | 22 | 14 / 24 |
| -12 | 55 | -81 | 18 | -82 | 15 | 33 | -77 | 42 | 1 | 14 | -22 | -1 | 6 | 19 | 1 | 50 | 33 | 51 | -15 | 8 | 8 | -15 | -17 | 32 | -16 | 1 | 20 | -9 | -67 | -23 | -5 / 21 |
| -11 | 8 | 26 | -35 | 70 | -12 | -8 | 9 | 21 | 11 | -11 | -40 | 24 | -29 | 12 | 17 | -22 | 35 | -50 | -29 | 1 | -7 | 5 | 16 | -13 | -53 | 20 | -2 | -25 | 10 | 4 | 75 / -81 |
| -13 | -9 | 63 | -1 | -33 | 29 | 22 | 42 | -12 | -22 | 1 | 9 | 14 | 1 | -35 | -9 | -84 | 5 | 28 | 13 | -8 | -12 | 8 | 23 | 9 | -43 | 42 | 17 | -14 | 16 | 14 | 11 / 14 |
| -19 | 7 | -17 | 49 | 8 | -27 | -2 | 46 | -7 | 8 | 22 | 3 | -48 | 10 | 45 | 37 | -4 | -10 | -30 | 34 | 0 | -27 | -77 | -39 | 7 | 46 | 11 | -12 | 12 | -6 | 10 | -26 / 10 |
| 33 | 0 | 0 | -21 | -39 | 7 | -20 | -20 | -18 | 3 | -26 | 6 | 61 | -14 | 8 | -35 | 16 | 12 | 8 | 36 | -37 | 38 | -13 | -29 | 0 | -36 | -14 | 46 | -2 | -28 | 0 | 4 |
| 35 | 67 | -69 | -9 | -22 | 7 | 55 | -15 | 16 | 28 | -52 | -15 | -11 | 24 | -20 | -49 | -25 | 43 | -47 | 35 | -9 | -25 | 31 | -28 | 6 | 17 | -32 | -17 | 14 | 20 | -11 / 49 |
| -46 | 0 | 27 | -5 | 0 | 55 | -2 | -2 | 3 | -21 | 3 | 39 | 12 | 11 | -12 | 33 | 23 | -33 | 42 | -39 | 36 | -19 | -28 | -6 | 22 | 68 | 1 | -31 | 2 | -10 | -36 / -44 |
| -4 | -23 | 11 | 28 | -18 | 19 | -31 | 27 | -24 | 7 | -1 | -1 | -6 | 21 | -31 | -66 | 11 | -7 | 7 | -17 | 15 | -3 | -24 | -17 | 61 | 16 | 9 | 34 | 6 | -13 | 69 / 24 |
| -31 | -19 | 23 | -5 | -4 | 12 | -29 | -24 | -14 | -20 | -28 | 14 | -14 | 26 | 37 | 34 | 29 | 9 | -7 | -19 | -41 | -7 | 18 | -29 | -3 | -18 | 22 | -9 | -22 | -12 | -9 | -21 / -16 |
| 8 | 4 | 36 | 59 | -22 | 5 | -43 | -11 | 62 | 5 | -9 | -11 | -17 | -10 | 17 | -25 | 14 | 14 | 9 | -2 | 51 | 41 | -29 | 30 | 9 | -64 | 9 | 10 | 26 | -1 | -19 | 16 / 19 |
| 3 | 8 | -15 | -68 | -9 | 21 | -31 | -28 | 6 | -52 | -9 | 17 | -2 | -2 | -21 | -30 | -25 | 20 | -58 | -3 | 8 | -57 | 30 | 59 | 30 | -8 | 25 | 5 | 7 | -19 | -8 | -6 / 28 |
| 7 | 19 | 61 | -33 | -14 | -48 | 23 | -28 | 2 | 0 | 11 | 20 | -42 | 1 | -2 | 9 | 23 | 47 | 5 | 1 | 16 | -28 | 30 | 15 | -14 | -3 | 20 | -23 | 6 | 15 | -5 | 5 / -9 |
| 33 | -6 | -37 | 12 | 29 | 21 | -3 | 26 | 2 | -1 | 24 | 33 | -11 | 0 | 19 | 10 | -2 | 0 | -26 | -30 | 11 | 1 | -29 | -30 | -3 | -28 | 4 | 13 | -24 | 14 | -9 | 15 / 11 |
| 22 | 0 | -53 | 70 | -79 | -17 | -54 | 0 | 13 | 15 | -36 | -3 | -3 | 21 | 6 | 7 | 19 | 4 | 4 | 2 | -18 | 18 | 8 | 3 | 30 | 12 | -26 | 21 | 26 | 16 | 18 / -24 |
| 1 | 21 | 5 | -25 | 4 | 26 | 32 | 12 | 15 | -9 | -2 | -1 | 28 | 7 | 6 | 27 | 14 | -19 | -21 | -3 | 11 | -2 | 35 | -59 | 19 | 7 | -35 | 6 | -1 | 11 | -55 | -24 / -40 |
| -49 | 12 | 0 | 12 | 16 | 35 | -18 | -36 | -9 | -34 | 11 | 19 | -25 | 68 | 45 | -4 | 29 | -5 | 34 | 23 | -20 | 14 | -2 | -48 | 18 | 24 | 29 | 15 | 4 | 5 | -31 / 0 |
| 50 | -3 | 3 | 9 | 2 | -28 | -20 | 18 | 12 | -43 | 17 | -21 | 33 | 8 | 21 | -24 | -5 | -3 | -14 | -5 | -20 | 21 | 61 | -55 | 1 | -6 | -15 | 15 | 7 | 74 | 0 | |

TABLE 3D-continued

Lower Right =

| | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|
| 7 | 37 | -6 | 9 | -28 | 1 | 4 | 51 | 8 | 51 | -41 | -9 | -26 | -45 | 14 | -10 | -13 | -39 | -4 | 64 | -23 | 22 | -56 | 16 | -2 | -27 | -10 | -3 | 0 | -27 | -7 |
| 33 | -50 | -33 | -16 | 10 | 5 | -11 | -13 | -3 | -2 | 7 | -12 | -94 | 44 | 63 | -18 | 4 | 10 | 25 | -9 | -31 | 7 | 4 | -13 | 10 | -5 | -3 | 39 | -30 | 7 | -23 |
| 30 | 1 | -52 | 9 | -12 | 53 | 22 | -10 | -31 | 0 | -59 | 53 | 13 | 28 | -16 | -19 | 32 | -27 | -44 | -35 | 29 | 20 | -8 | -6 | 21 | 0 | 5 | 18 | 0 | -25 | -21 |
| -18 | 38 | 18 | -15 | 0 | 34 | -46 | -2 | -8 | 30 | -19 | -9 | 41 | 16 | 23 | -35 | -29 | 20 | 30 | 28 | -10 | -19 | 22 | 1 | -37 | 14 | 32 | -31 | 2 | 1 | 50 |
| -53 | -16 | -5 | -2 | -3 | -10 | 19 | -24 | 32 | -14 | 53 | -9 | 35 | -20 | 19 | -30 | -29 | 20 | 32 | 28 | -19 | 4 | 1 | 31 | -24 | -33 | 32 | -18 | -4 | 36 | 2 |
| 26 | 12 | -8 | 0 | 48 | 9 | 5 | 0 | -12 | 0 | -26 | -56 | 1 | 7 | -49 | 15 | -7 | 17 | -9 | -9 | 4 | 26 | 42 | -5 | -33 | 45 | 16 | 35 | -23 | -44 |
| 37 | 24 | 9 | 51 | -93 | -11 | 25 | 5 | -2 | -10 | -56 | 31 | 22 | -15 | 33 | -7 | 9 | 2 | 41 | 38 | -20 | 35 | 16 | -22 | -3 | 1 | 9 | -32 | -6 | -38 |

What is claimed is:

1. A method of forming a dispersed message for embedding in an image, comprising the steps of:
   a) providing a single random phase carrier;
   b) defining a set of ordered bit locations, the number of the bit locations being greater than one and substantially less than the number of pixels within the carrier;
   c) cyclically shifting the random phase carrier in accordance with each bit location; and
   d) weighting the cyclically shifted carriers in accordance with a polarity of the corresponding bit, and forming a sum of the cyclically shifted weighted carriers to form the dispersed message.

2. The method of claim 1, wherein the method is practiced in a computer.

3. The method of claim 1, wherein the method is practiced in a digital camera.

4. The method of claim 1, wherein the method is practiced in a printer.

5. An apparatus for forming a dispersed message for embedding in an image, the apparatus comprising:
   a) a means for providing a random phase carrier;
   b) a means for defining a set of ordered bit locations, the number of the bit locations being greater than one and substantially less than the number of pixels within the carrier;
   c) a means for cyclically shifting the random phase carrier in accordance with each bit location; and
   d) a means for weighting the cyclically shifted carriers in accordance with a polarity of the corresponding bit, and forming a sum of the cyclically shifted weighted carriers to form the dispersed message.

6. The apparatus of claim 5, wherein the apparatus is a camera.

7. The apparatus of claim 5, wherein the apparatus is a printer.

8. The apparatus of claim 5, wherein the apparatus is a scanner.

9. The apparatus of claim 5, wherein the apparatus is a computer having a display device.

10. The apparatus of claim 6, wherein the means for cyclically shifting the random phase carrier in accordance with each bit location comprises a look up table, but not a modulus function from a computer programming library.

11. The method of claim 1, wherein the cyclical shifting is conducted in accordance with a look-up table.

12. The method of claim 11, without a step of adding memory storage capability.

13. The method of claim 3, further comprising the steps of, when the digital image is larger than the dispersed message, adding the dispersed message to the digital image in a tile wise fashion, then storing the image containing the hidden message in a memory standard to the digital camera.

14. The method of claim 13, further comprising the step of adding the hidden message to the digital image prior to compression, when the digital image is compressed.

* * * * *